US010443767B2

(12) United States Patent
Readman

(10) Patent No.: US 10,443,767 B2
(45) Date of Patent: Oct. 15, 2019

(54) COUPLING ASSEMBLY

(71) Applicant: SELF-ENERGISING COUPLING COMPANY LIMITED, Wincham (GB)

(72) Inventor: Matthew Joseph Readman, Manchester (GB)

(73) Assignee: SELF-ENERGISING COUPLING COMPANY LIMITED, Wincham (GB)

(*) Notice: Subject to any disclaimer, the term of this patent is extended or adjusted under 35 U.S.C. 154(b) by 252 days.

(21) Appl. No.: 15/429,741

(22) Filed: Feb. 10, 2017

(65) Prior Publication Data
US 2017/0152972 A1 Jun. 1, 2017

Related U.S. Application Data

(63) Continuation of application No. 12/063,406, filed as application No. PCT/GB2006/002965 on Aug. 7, 2006, now abandoned.

(30) Foreign Application Priority Data

Aug. 8, 2005 (GB) .................................. 0516260.7

(51) Int. Cl.
*F16L 17/02* (2006.01)
*F16L 21/02* (2006.01)
(Continued)

(52) U.S. Cl.
CPC ............. *F16L 21/022* (2013.01); *F16L 17/02* (2013.01); *F16L 21/002* (2013.01); *F16L 37/06* (2013.01);
(Continued)

(58) Field of Classification Search
CPC ......... F16L 21/002; F16L 17/02; F16L 37/30; F16L 37/34; F16L 37/36; F16L 37/35; F16L 37/46; F16L 37/42
(Continued)

(56) References Cited

U.S. PATENT DOCUMENTS 1,806,983 A * 5/1931 Norgren .................. F16L 37/42
137/223
RE24,406 E * 12/1957 Wier ....................... F16L 37/46
251/149.5
(Continued)

*Primary Examiner* — David Bochna
(74) *Attorney, Agent, or Firm* — Shumaker, Loop & Kendrick, LLP

(57) ABSTRACT

A coupling assembly for releasably interconnecting fluid passages comprises male and female coupling members, which are mated by inserting a probe and socket of the members respectively. Each coupling member has a first end arranged for connection to a fluid passage. When mated in use, the coupling assembly provides a straight fluid conduit between the fluid passages comprising through-bores in each of the coupling members coincident along a first longitudinal axis. When mated in use, the probe and socket are arranged coincident on a second longitudinal axis, which is inclined to the first axis. Sealing means comprising an annular sealing ring proximate each of the socket and probe are arranged, when mated in use, either side of an intersection between the through-bore and socket. The sealing arrangement is such that fluid within the fluid conduit exerts a net force resisting separation of said coupling members.

19 Claims, 15 Drawing Sheets

(51) Int. Cl.
*F16L 21/00* (2006.01)
*F16L 37/06* (2006.01)
*F16L 41/08* (2006.01)
*F16L 37/091* (2006.01)
*F16L 37/30* (2006.01)

(52) U.S. Cl.
CPC ............. *F16L 37/091* (2013.01); *F16L 37/30* (2013.01); *F16L 41/08* (2013.01)

(58) Field of Classification Search
USPC .............................................. 285/132.1, 103
See application file for complete search history.

(56) References Cited

U.S. PATENT DOCUMENTS

| | | | | |
|---|---|---|---|---|
| 4,285,364 | A * | 8/1981 | Hawker | F16L 37/42 137/614.03 |
| 5,325,890 | A * | 7/1994 | Wilkins | F16L 37/30 137/614.03 |
| 6,679,472 | B2 * | 1/2004 | Baugh | E21B 33/038 166/86.3 |

\* cited by examiner

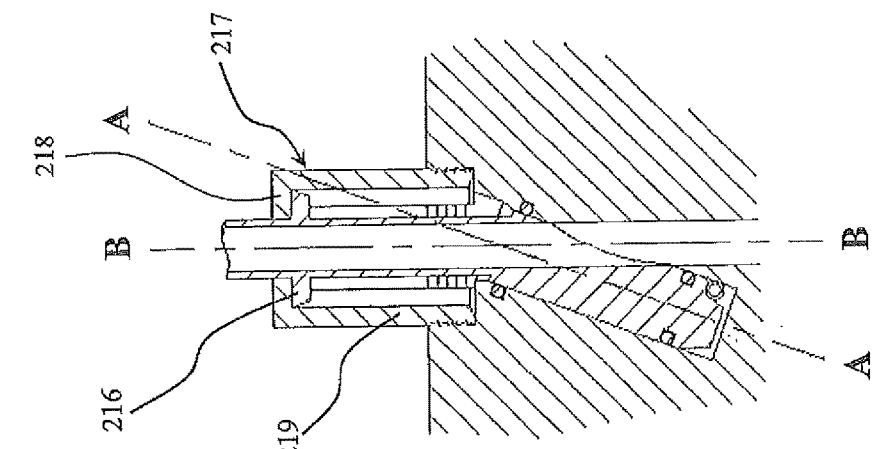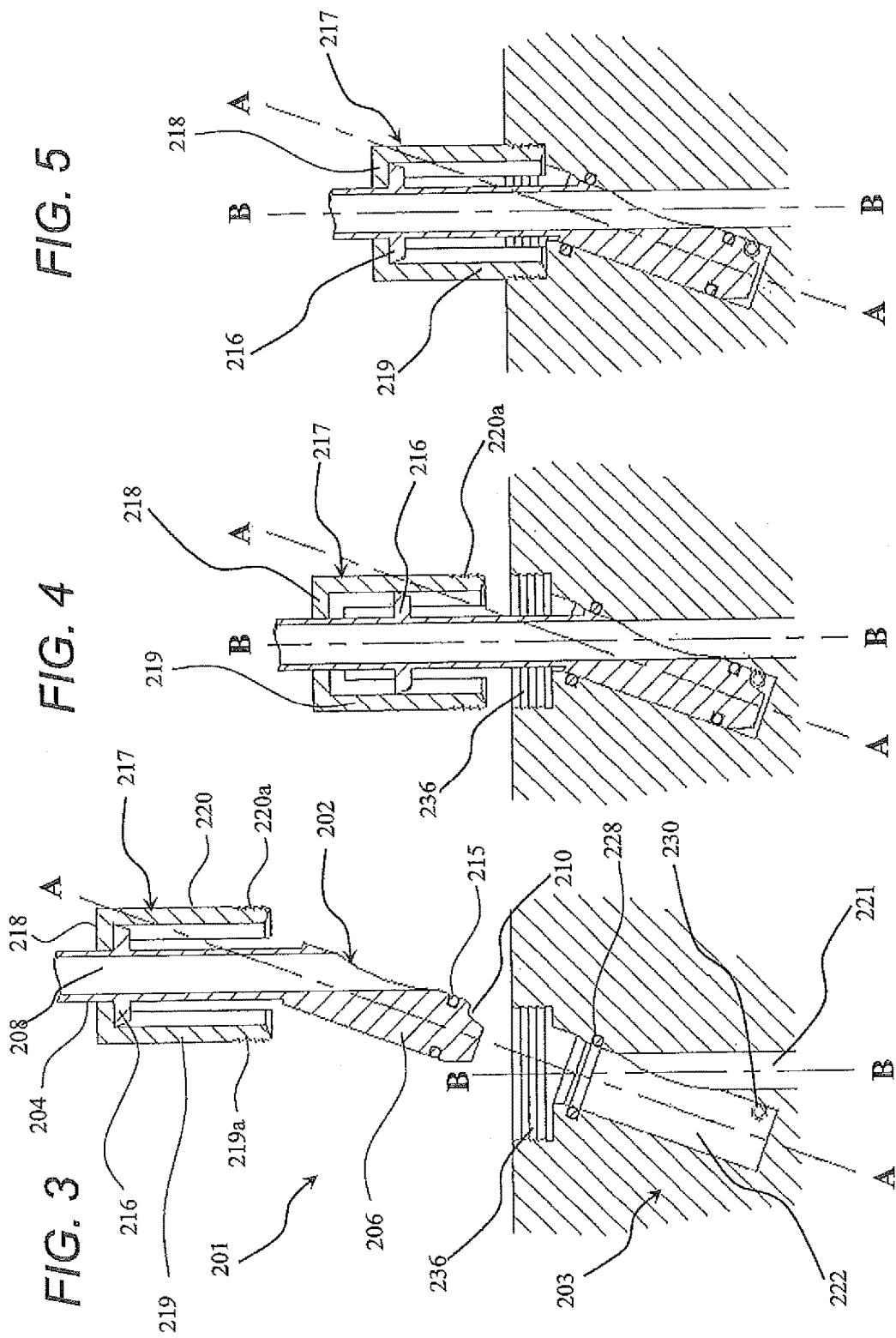

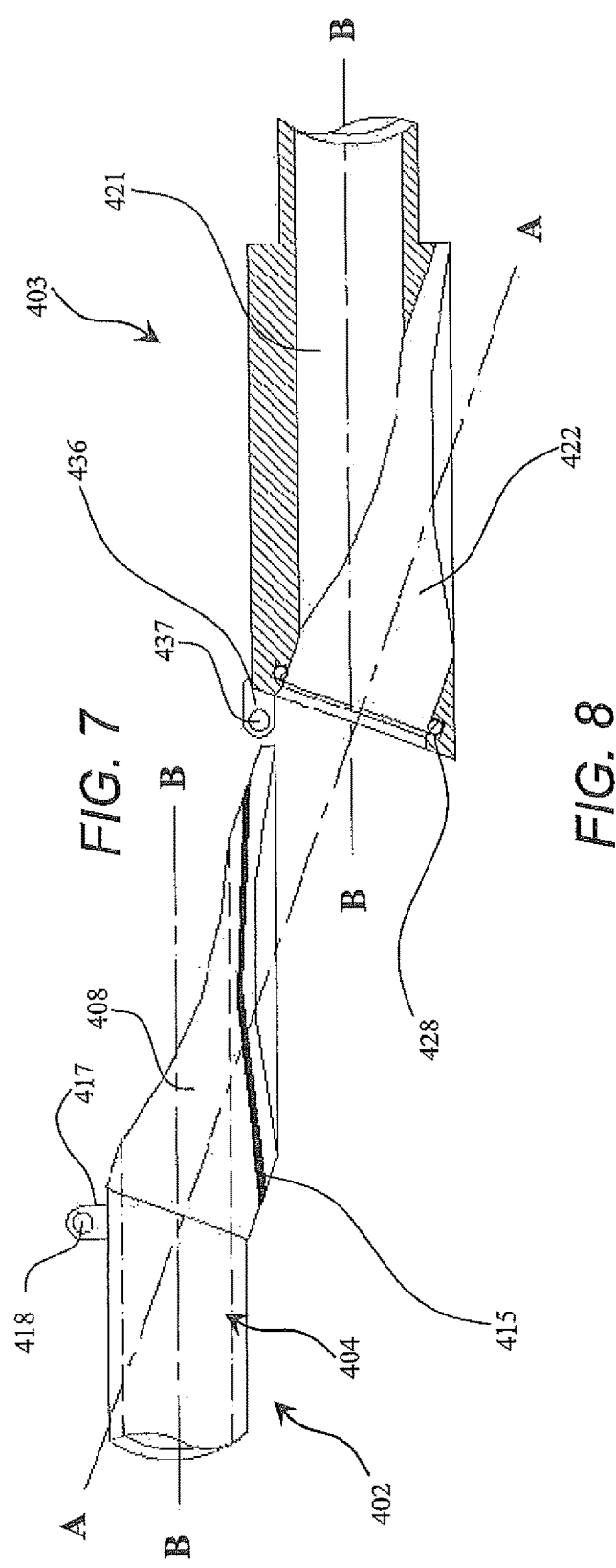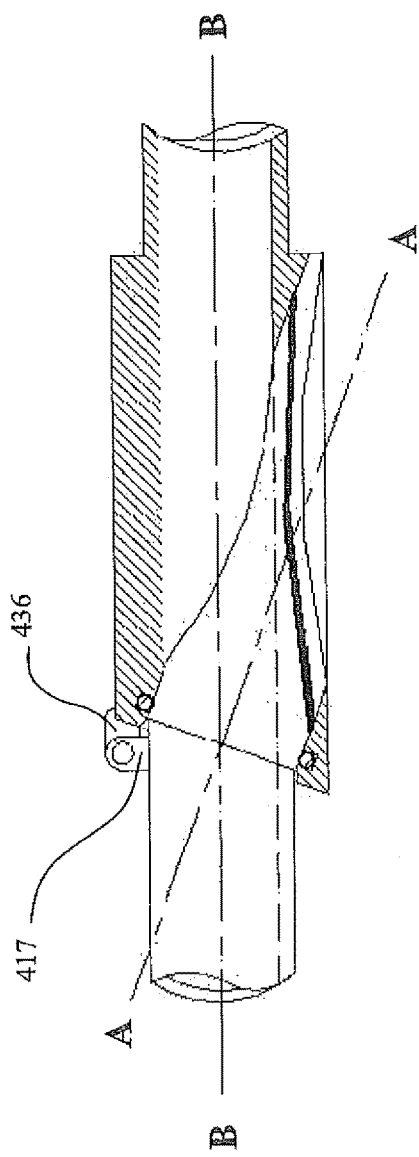
FIG. 7
FIG. 8

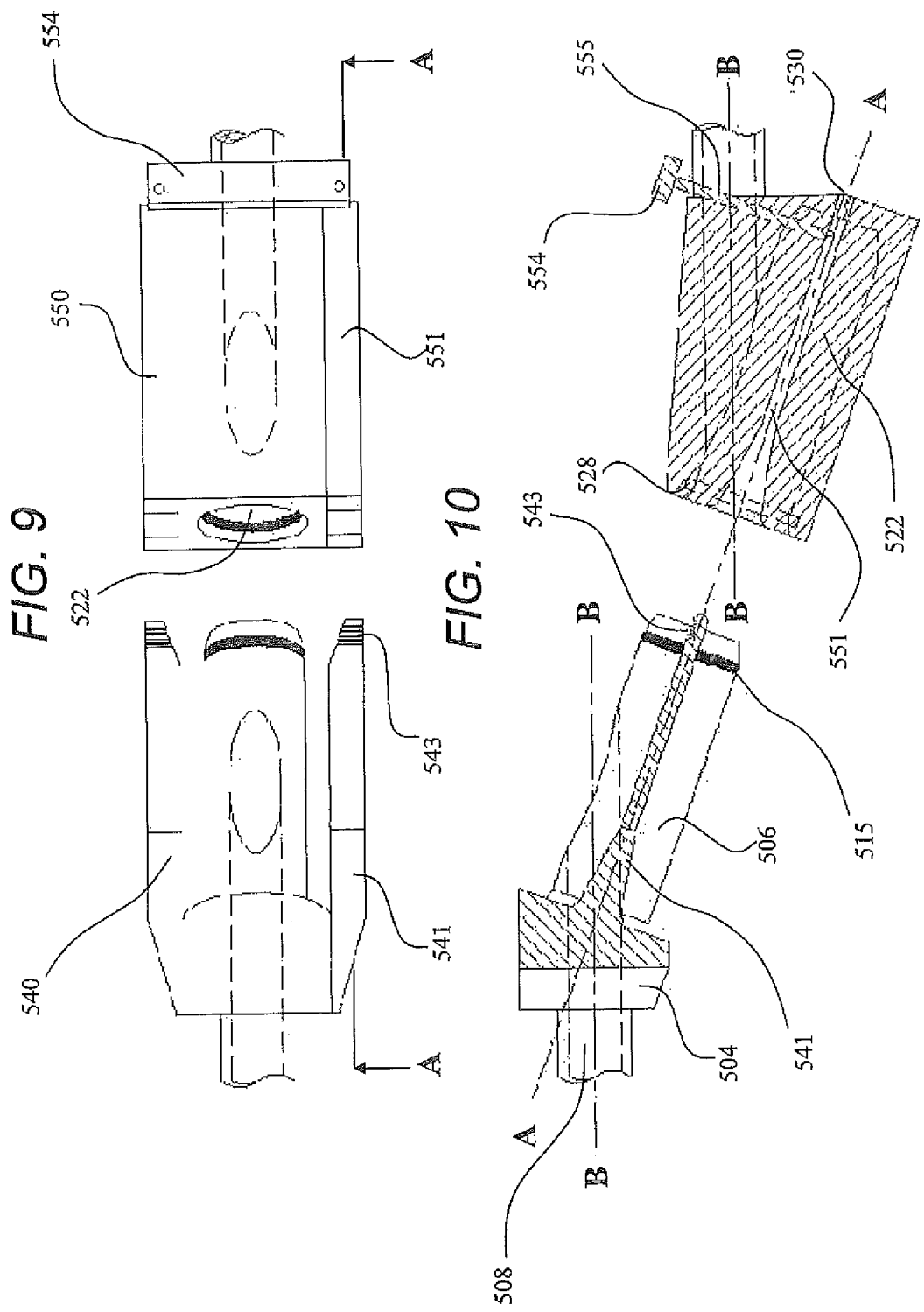

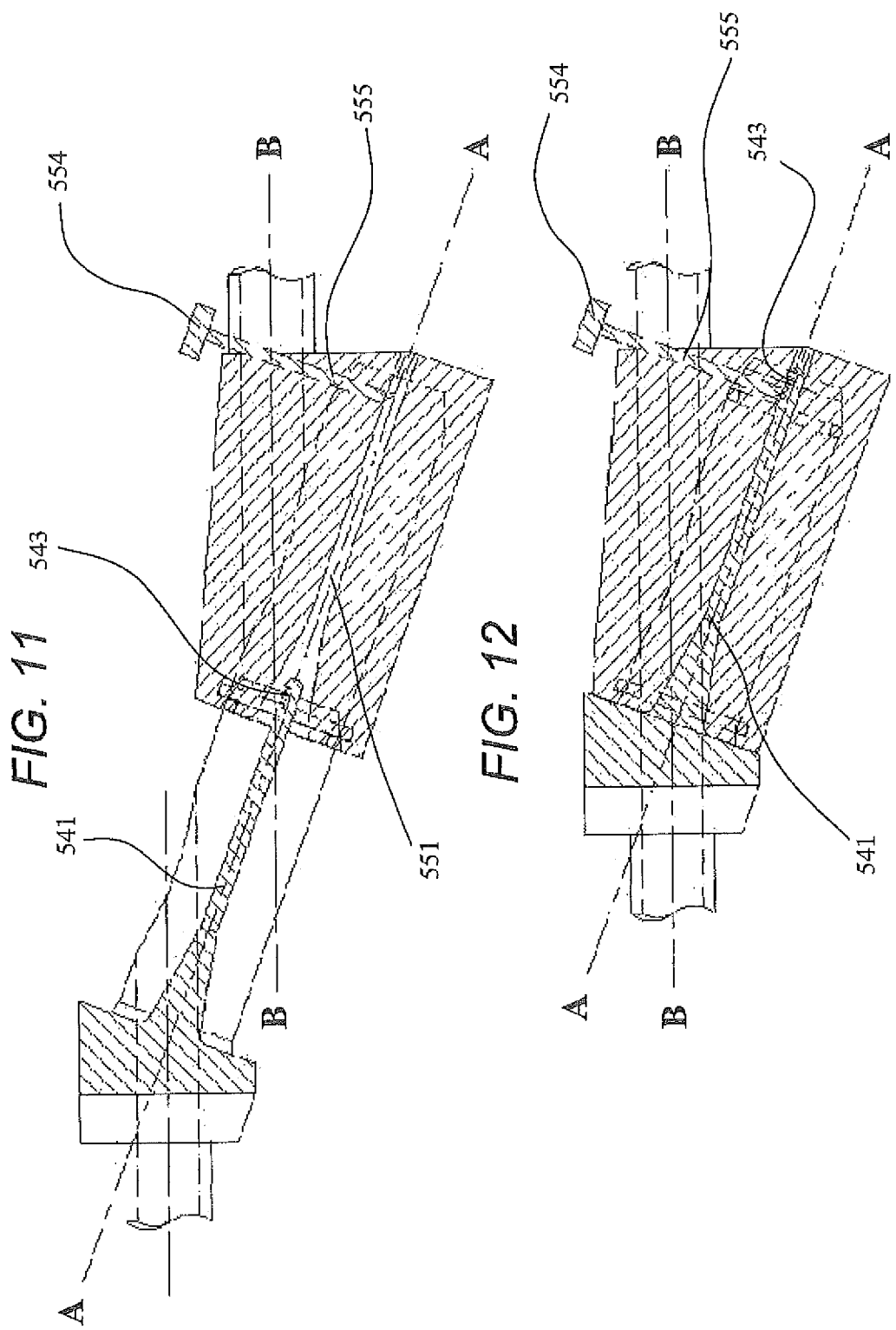

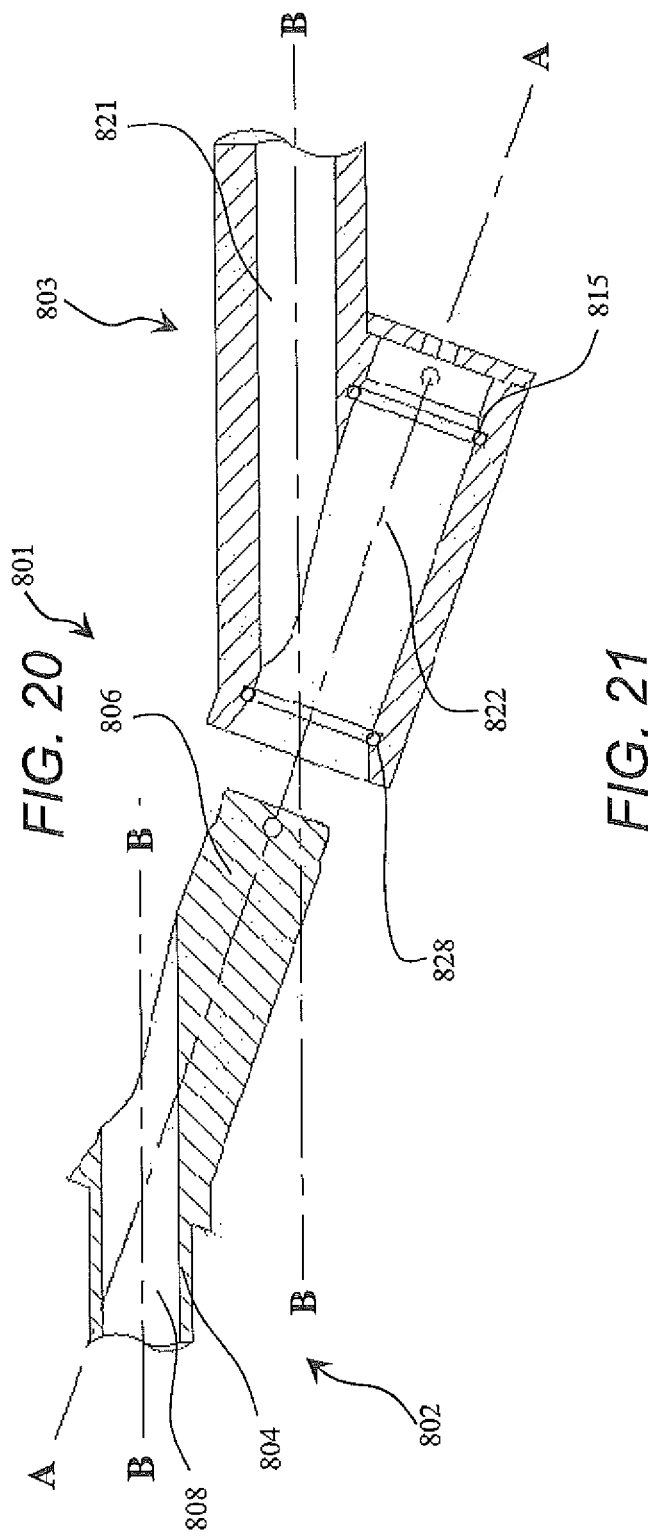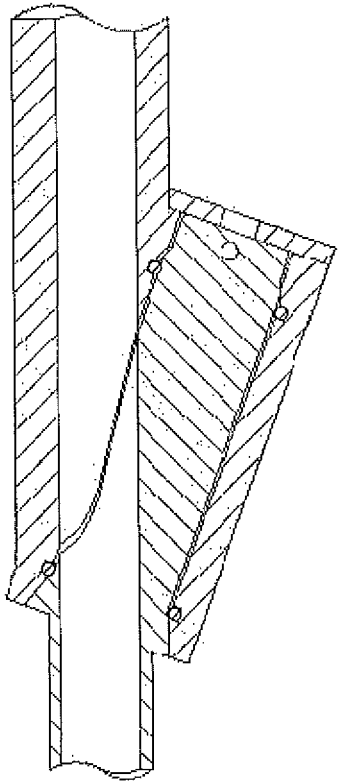

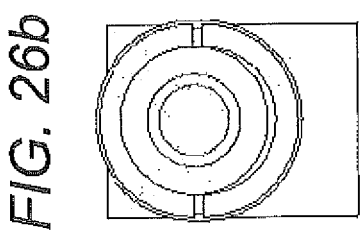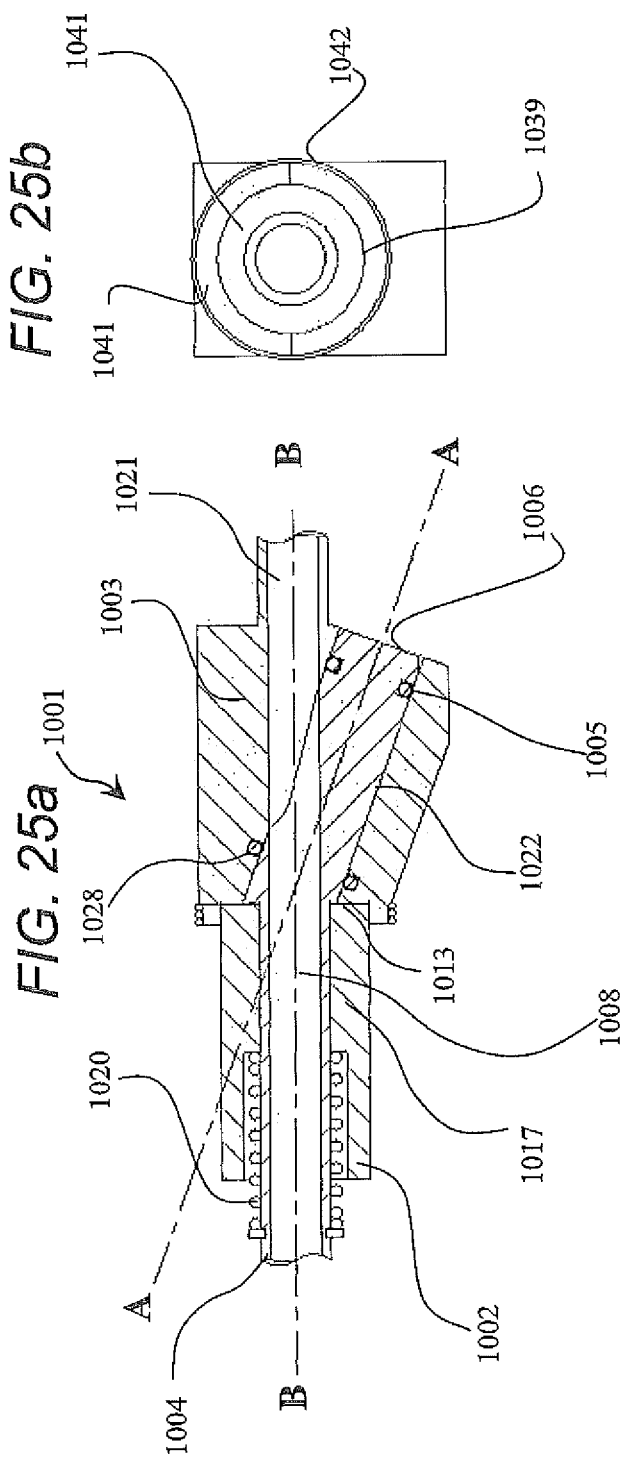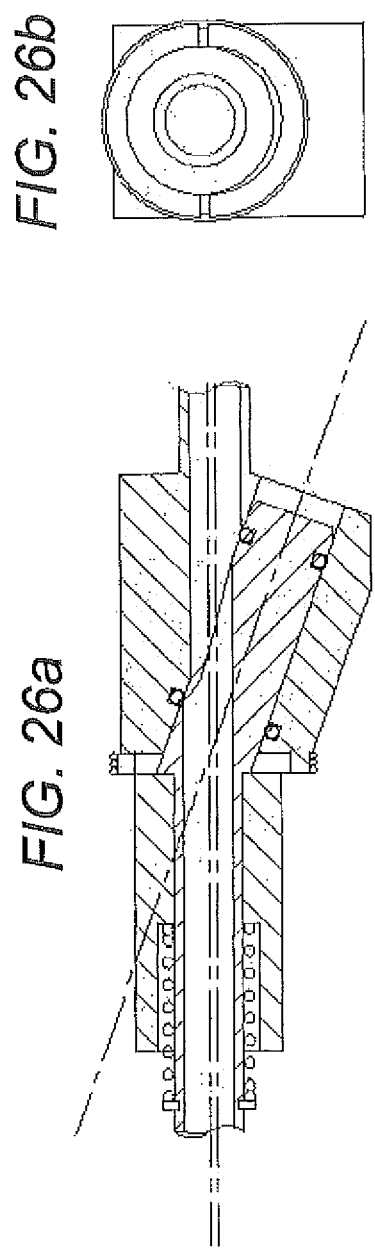

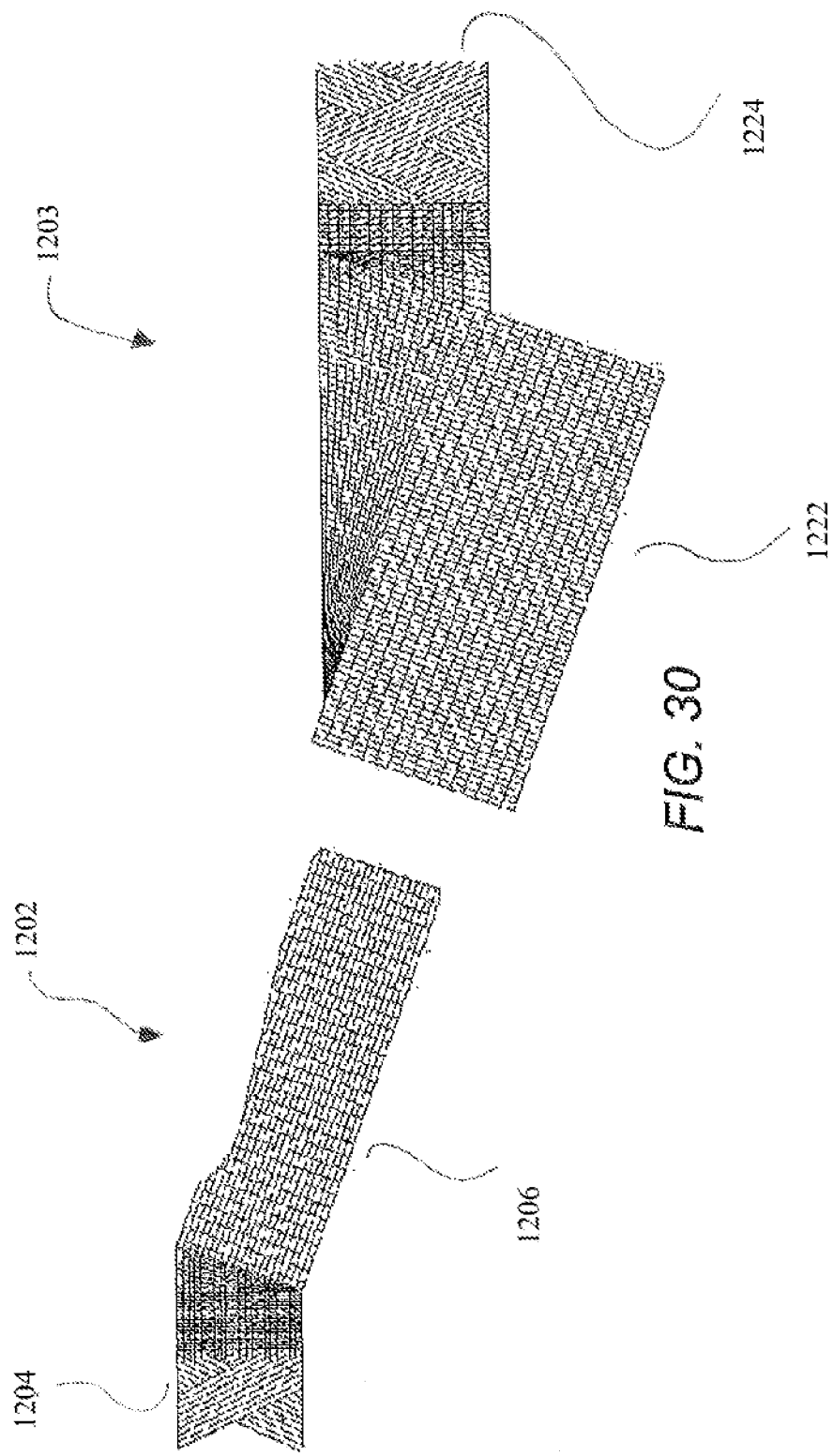

COUPLING ASSEMBLY

TECHNICAL FIELD AND BACKGROUND OF THE INVENTION

The present invention relates to a coupling assembly and in particular to a coupling assembly suitable for releasably interconnecting fluid passages.

It is a common requirement in many industries to be able to quickly and releasably interconnect two passages (e.g. pipes or hoses) containing fluids. The range of fluids to be transported, together with their properties, may vary widely, including gases such as air within medical oxygen masks and liquids such as oil within undersea drilling operations. The pressure of the fluid passing through the coupling assembly may vary from substantially the same as the ambient pressure around the assembly in the case of oxygen masks to high-pressure liquids at pressures many times the ambient pressure in the case of oil pipelines.

A number of quick release coupling arrangements are known in the art whereby the ends of fluid passages are provided with corresponding coupling members to facilitate the joining of passages. This may be provided in the form of a female coupling member comprising a socket and a corresponding male coupling member comprising a probe receivable in the socket. The coupling members may further be provided with breakout valves such that when the male and female coupling members are uncoupled the ends are sealed off preventing fluid from escaping.

However, releasable coupling arrangements comprising a socket and probe can create large separation forces, which act to expel the male and female coupling members apart. The separation force is generated due to the pressure of the fluid within the coupling assembly exerting a pressure upon the end portion of the male coupling member and is therefore a product of the pressure and cross-sectional area of the probe at the point where it exits the socket. Consequently, the separation force quickly becomes large with high-pressure fluids and large diameters. When the separation force becomes greater than the frictional force retaining the coupling parts together, it is necessary to incorporate an additional form of mechanical retention in order to prevent the coupling assembly from uncoupling.

However, such mechanical retention devices may be required to break under a predetermined force applied to the coupling assembly. For instance, for air-to-air refueling operations a tanker aircraft trails a fuel pipeline. At the end of the pipeline remote from the tanker aircraft is a drogue, which comprises the female coupling member. The aircraft to be refueled is fitted with a forward extending probe, the end of which forms the male coupling member. In order to prevent the coupling assembly from pulling apart during turbulence and with small changes in relative position of the aircraft, the coupling assembly must incorporate some form of retention means. However, in an emergency situation it is essential that the coupling releases under a predetermined force. This force is known as the breakout strength.

This desired breakout strength may be relatively low compared with the strength of the mechanical retention device used to overcome the separation force exerted upon the male member by the fluid within the coupling assembly. Consequently, this can lead to the retention device being constrained to only break or release under a higher applied force than would ideally be desirable, due to the design tolerances of the retention device.

The mechanism used to counteract the separation force of a coupling assembly can be separate from the mechanism used to provide the breakout strength, in order that the breakout strength may be set independently.

It is known to reduce the separation forces within coupling assemblies by arranging the assembly such that in addition to, and counteracting, the separation force created by the fluid, a force acting to resist separation is created by the fluid. The coupling assembly is arranged such that it comprises an internal surface upon which fluid exerts pressure of equal area to the cross sectional area of the male coupling member where it exits the female coupling member. Consequently the coupling is said to be "pressure balanced", effectively resulting in a zero net separation force due to the internal fluid pressures.

Currently however, releasable coupling arrangements include protrusions and fluid paths that create turbulence when transmitting fluid between one conduit or pipe to another. It is also not possible to 'pig' such couplings, which is a requirement in the oil transmission industry and consists of moving a device through the inside of a pipe line for the purpose of cleaning, dimensioning, or inspecting.

SUMMARY OF THE INVENTION

It is an object of the current invention to attempt to overcome at least one of the above or other disadvantage.

According to one aspect of the present invention a coupling assembly for releasably interconnecting fluid passages comprises male and female coupling members, which are mated in use by inserting a probe of the male member into a socket of the female member, each coupling member including a first end arranged for connection to a fluid passage and a through bore extending from the first end, wherein when mated in use, the through-bores of each coupling member are coincident along a first longitudinal axis and the probe and socket are coincident along a second longitudinal axis, which is inclined to the first axis, the through-bores providing a fluid conduit between the two fluid passages and fluid being substantially retained in the conduit by sealing means.

Preferably the angle of inclination between the first and second longitudinal axes is between 5° and 35°. Preferably the angle of inclination between the first and second longitudinal axes is between 10° and 30°. Preferably the angle of inclination between the first and second longitudinal axes is between 15° and 25°.

Preferably the sealing means may comprise a first and second annular sealing ring. The sealing rings may be arranged in use to be either side of an intersection between the through-bores and socket. The sealing rings may both be external annular sealing rings on the probe, such that no net separation force is generated. Alternatively, the sealing rings may both be internal annular sealing rings within the socket, such that no net separation force is generated. However, preferably the first annular sealing ring may comprise an internal annular sealing ring within the socket and the second annular sealing ring may comprise an external annular sealing ring on the probe, such that fluid within the fluid conduit exerts pressure on the internal surfaces to provide a net force resisting separation of said mated coupling members.

In contrast to other coupling arrangements, rather than creating a separation force or pressure balanced system, fluid pressure within the coupling assembly is arranged to energise the assembly, providing a net force resisting separation of the male and female coupling members. By control of the dimensions within the assembly, this net force (the "pull out" strength) can be set at a desired breakout strength, or set relatively low, with the desired breakout strength set by an alternative mechanism.

Preferably the fluid passage connected to the first end of the female coupling member may be coincident with the through-bore of the female member and the fluid passage connected to the first end of the male coupling member may be coincident with the through-bore of the male member. The probe may comprise a second end of the male coupling member. The socket may comprise a second end of the female coupling member and the through-bore of the female member may extend from the first end and intersect the socket.

Preferably the probe may be of substantially uniform outer diameter, and the socket may be of substantially uniform inner diameter. The through-bores in the male and female coupling members may be substantially straight, wherein when the coupling members are mated in use the through-bores define a straight fluid conduit. The through-bores in the male and female coupling members may be of identical constant diameter.

Additionally the present invention provides a single in-line fluid flow between the two fluid passages, which enables the coupling to be 'pigged'.

Preferably the coupling assembly may further comprise releasable retaining means arranged to resist the uncoupling of the mated coupling members. The male coupling member may further include a diametrical through-hole and the female coupling member may further include at least one diametrically aligned through-hole, and when mated the through holes may be aligned and the retaining means may comprise a pin, which is inserted through the holes. The diametrical through-hole of the male coupling member may be arranged on the probe and the or each diametrical through-hole of the female coupling member may be arranged in the socket. The retaining means may comprise a first part, which, in use, is arranged fast with the male coupling member, and a second part, which, in use, is arranged fast with the female coupling member, and wherein in use the first part and second part engage with each other, said engagement comprising the retaining means. The first and second parts may each comprise a rack of radial teeth. The radial teeth of the first part may face outwardly and the radial teeth of the second part may face inwardly. The radial teeth of the first part may face inwardly, and the radial teeth of the second part may face outwardly.

Preferably, the first part comprises a clip. The clip may comprise resilient material. The clip may comprise first and second sections arranged about opposing sides of the first longitudinal axis and are joined by a connecting section that in use abuts a flange on the male coupling member, where said abutment comprises the first arrangement of the clip and male member, and wherein at least one of said first and second sections includes spaced from the connecting section the radial teeth. The radial teeth of the clip may be removeably engaged by pivoting at least one of the first or second sections about the connecting section. The face of the flange in abutment with the connecting section may comprise an oblique face.

Preferably the socket of the female coupling member further includes a closed end and an aperture from the socket, wherein, in use, the aperture is arranged in communication with a space between the closed end and a distal end of the probe, such that when the probe is inserted into the socket ambient fluid within the socket is forced out of the aperture and the egress rate of the ambient fluid from the aperture determines the insertion force required to insert the probe into the socket. The aperture may extend through the closed end of the socket. The aperture may comprise a split pin which is inserted through a hole, the female coupling member further comprising the hole, which extends orthogonal to the axis of the socket. The probe may further include a non-symmetrical feature that is arranged, in use, to co-operate with the split pin, such that when the probe is in an incorrect orientation about the second longitudinal axis, the probe abuts the split pin before the through-bores are aligned.

Preferably the male and female coupling members further comprise co-operating alignment features wherein said co-operation limits the relative orientation about the second longitudinal axis that the probe can be inserted into the socket. The co-operating parts may comprise at least one and preferably two male features which are fast to the male coupling member and parallel to the second longitudinal axis, the co-operating parts may further comprise for each male feature a corresponding female feature, which are fast to the female coupling member, wherein, during insertion of the probe into the socket, the or each male feature co-operates with the or each female feature. The male features may further comprise notches and the female coupling member may further comprise apertures that intersect the female features, and wherein a locking means locates in the apertures and, when arranged in use, engages with the notches to provide the releasable retaining means.

Preferably the male coupling member may comprise a valve, which prevents fluid flow along the through-bore in a closed position and allows fluid flow along the through-bore in an open position. The valve of the male coupling member may be operable between the open and closed position by rotating an operable feature. The operable feature may be operated by a part of the female coupling member, such that the valve is rotated from the open position to the closed position when the probe is uncoupled from the socket. The valve may further comprise biasing means, which acts to bias the valve towards the closed positions, wherein the operable feature is operated by a part of the female coupling member such that the valve is moved towards the open position when the probe is inserted into the socket. Preferably the female coupling member comprises a valve, which prevents fluid flow along the through-bore in a closed position and allows fluid flow along the through-bore in an open position. The valve of the female coupling member may be operable between the open and closed position by rotating an operable feature. The operable feature may be operated by a part of the male coupling member, such that the valve is rotated from the open position to the closed position when the probe is uncoupled from the socket. The valve may further comprise biasing means, which acts to bias the valve towards the closed position, wherein the operable feature is operated by a part of the male coupling member such that the valve is moved towards the open position when the probe is inserted into the socket.

Preferably the operable members include a first and second opposing edge and the other coupling member includes a co-operating feature, wherein during coupling the co-operating feature moves relative to the operable member and along the second longitudinal axis, the co-operating member abutting the first opposing edge to open the valve during coupling of the members and the co-operating member abutting the second opposing edge to close the valve during de-coupling of the members.

Preferably the male and female coupling members each include a respective through-bore closing member. The closing member of the male member may be moveable between a closed position, in which the closing member extends across the fluid aperture and wherein the second annular sealing ring is arranged on one side of the fluid aperture and a further sealing ring is arranged on an opposing side of the fluid aperture, and an open position in which the closing member does not extend across the fluid aperture. The closing member of the female member may be moveable between a closed position, in which the closing member extends across the fluid aperture and wherein the first annular sealing ring is arranged on one side of the fluid aperture and a further sealing ring is arranged on an opposing side of the fluid aperture, and an open position in which the closing member does not extend across the fluid aperture. The closing members may be slidably mounted about the probe and within the socket respectively. The closing members may be biased toward the closed position. Preferably the male and female coupling members may each include a retaining member for retaining each closing member in the closed position, wherein, in the closed position, each coupling member comprises a flat end.

Preferably the male coupling member is fabricated from a fibre composite structure, wherein, along the probe, the fibre packing in the axial direction is greater than the fibre packing in the radial direction. The female coupling member may be fabricated from a composite structure, wherein, along the socket section, the fibre packing in the radial direction is greater than the fibre packing in the axial direction.

According to a further aspect of the present invention, a method of releasably interconnecting fluid passages comprises inserting a probe of a male coupling member into a corresponding socket of a female coupling member, the coupling members being connected to the end of the fluid passages and at the junction between the two fluid passages, each coupling member including a first end arranged for connection to the fluid passage and a through bore extending from the first end, wherein when mated in use, the through-bores of each coupling member are coincident along a first longitudinal axis and the probe and socket are coincident along a second longitudinal axis, which is inclined to the first axis, the through-bores providing a fluid conduit between the two fluid passages and fluid being substantially retained in the conduit by sealing means.

Preferably, the method further comprises inserting a breakout pin through diametrically aligned holes in the male and female coupling members.

The present invention includes any combination of the herein referred to features or limitations.

The present invention can be carried into practice in various ways but several embodiments will now be described, by way of example, with reference to the accompanying drawings, in which:

BRIEF DESCRIPTION OF THE DRAWINGS

FIG. 3 is a schematic cross-sectional view of a second embodiment of the present invention in an unmated position;

FIG. 4 is a schematic cross-sectional view of the second embodiment of the present invention in a mated position, wherein the position is unsecured.

FIG. 5 is a schematic cross-sectional view of the second embodiment of the present invention in the mated position, wherein the position is secured.

FIG. 7 is a view of a forth embodiment of the present invention in an unmated position showing a male coupling member in a side view and a female coupling member in a schematic-cross sectional view.

FIG. 8 is a schematic cross-sectional view of the forth embodiment of the present invention in a mated position, wherein the male coupling member is not shown in a cross-sectional plane.

FIG. 9 is a schematic plan view of a fifth embodiment of the present invention in an unmated position.

FIG. 10 is a schematic cross-sectional view of the fifth embodiment of the present invention along A-A of FIG. 9.

FIG. 11 is a schematic cross-sectional view of the fifth embodiment of the present invention along line A-A of FIG. 9 when in an initial mating position.

FIG. 12 is a schematic cross-sectional view of the fifth embodiment of the present invention along line A-A of FIG. 9 when in a mated position.

FIG. 20 is a cross-sectional side view of an eighth embodiment of the present invention in an unmated position.

FIG. 21 is a cross-sectional side view of the eighth embodiment in a mated position.

FIG. 25a is a cross-sectional side view of a tenth embodiment of the present invention in a mated position.

FIG. 25b is an end view of FIG. 25a.

FIG. 26a is a schematic cross-sectional side view of the tenth embodiment in an un-mated position.

FIG. 26b is an end view of FIG. 26a.

FIG. 30 is a side elevation view of a twelfth embodiment of the present invention in an un-mated position.

DETAILED DESCRIPTION OF THE PREFERRED EMBODIMENT AND BEST MODE

Figure 1:
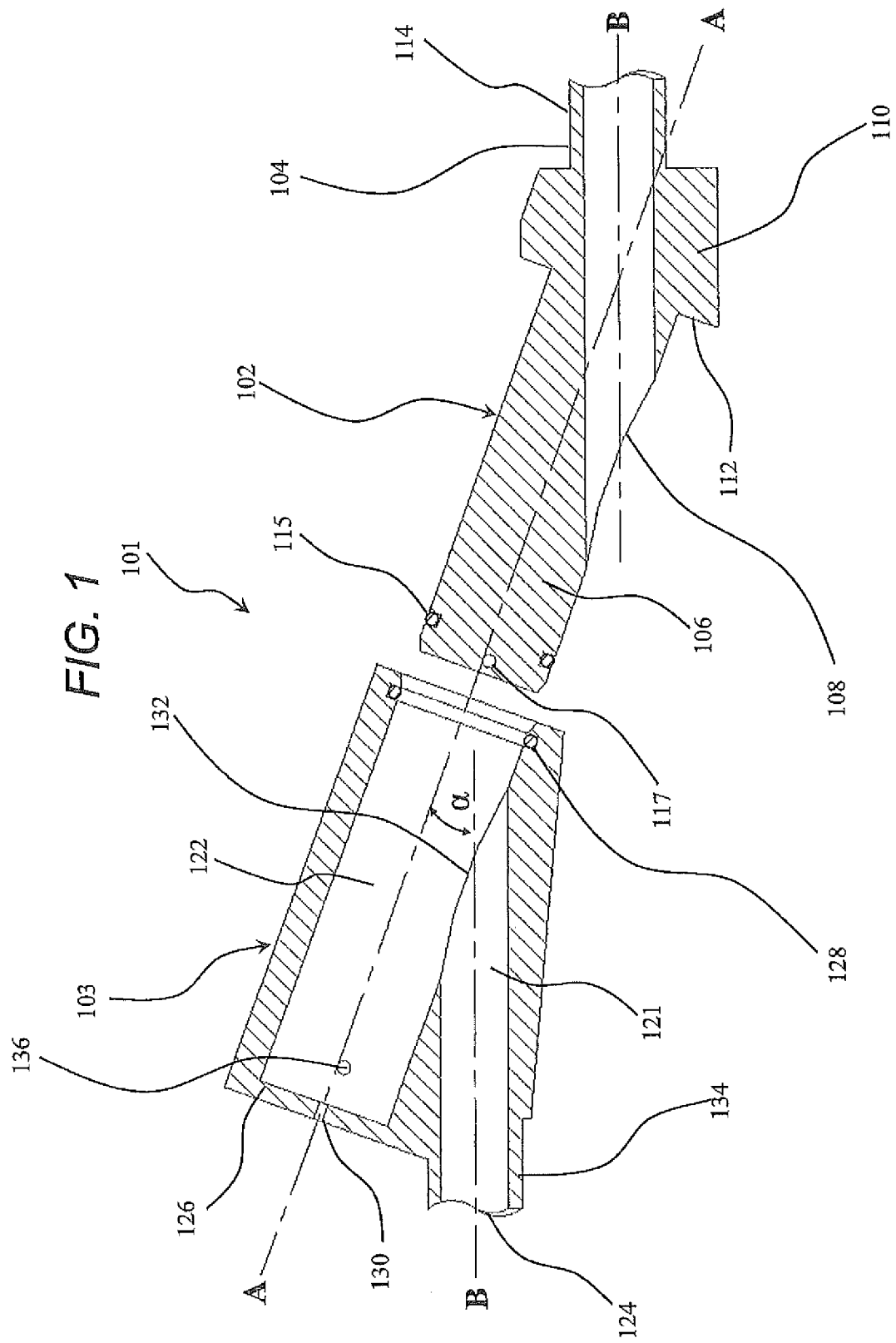
FIG. 1 is a schematic cross-sectional view of a first embodiment of the present invention in an unmated position.
Figure 2:
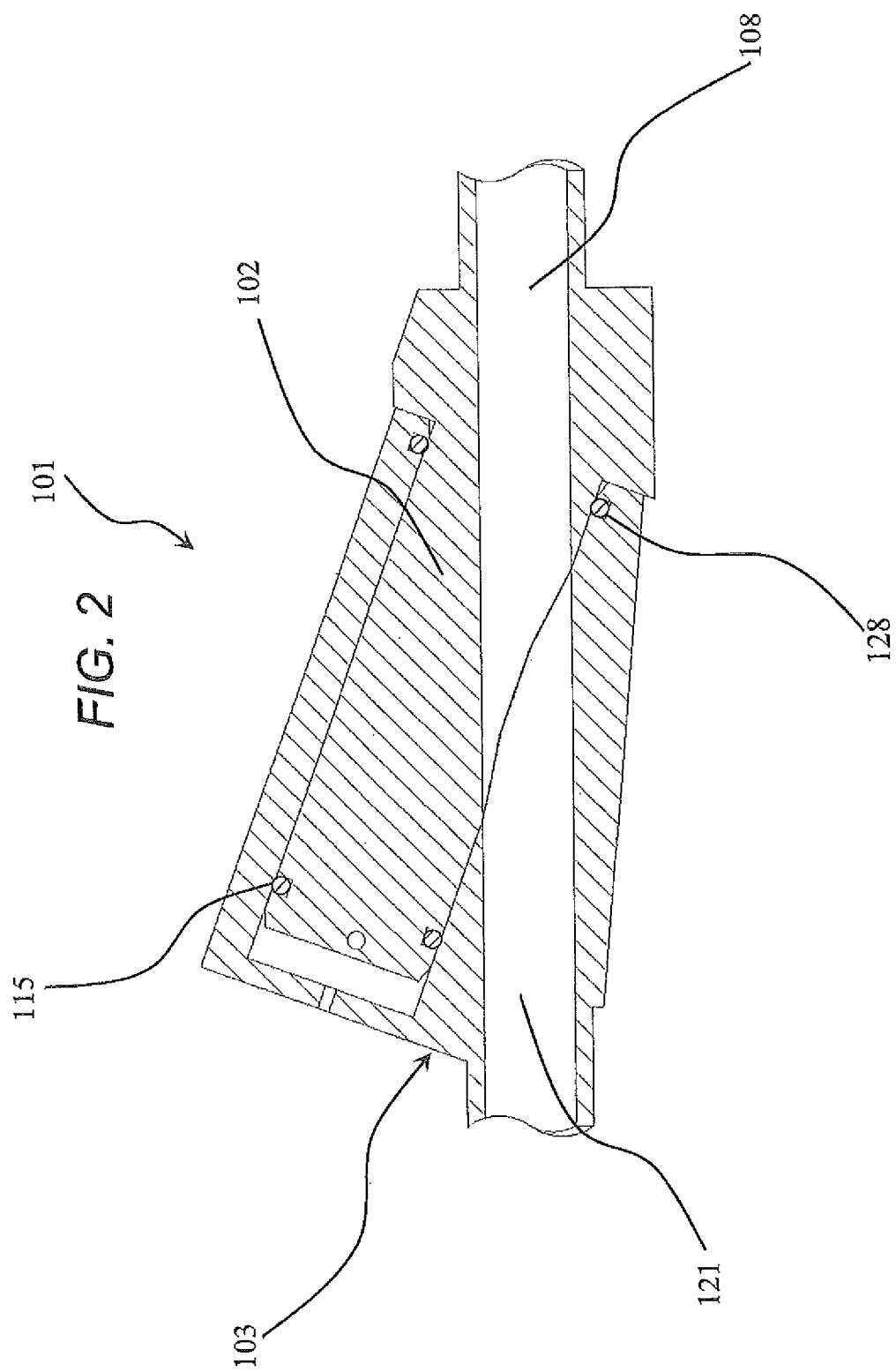
FIG. 2 is a schematic cross-sectional view of the first embodiment of the present invention in a mated position.

FIGS. 1 and 2 illustrate a first embodiment of the present invention. The coupling assembly 101 comprises male coupling member 102 and female coupling member 103 and these are shown uncoupled and coupled together, in FIGS. 1 and 2 respectively. In this embodiment there is a coupling axis A (the longitudinal axis along which the male coupling member 102 is inserted into the female coupling member 103 to define a conduit for fluid flow) and a flow axis B, defined by that conduit. Axes A and B subtend an angle α of about 20°.

The male coupling member 102 includes a proximal region 104 and a distal region in the form of a probe 106. The probe is in the form of a substantially cylindrical rod, which has an axis coincident with the coupling axis A. The male coupling member further comprises a circularly cylindrical through-bore 108, which has a straight axis that is coincident with the flow axis B and extends between a first aperture and second aperture. Said through-bore comprising a substantially constant diameter. The distal end of the proximal region includes the first aperture of the through-bore 108 and is adapted to communicate with a first fluid passage (not shown). The second aperture of the through-bore is arranged on a circumferential face of the probe.

The male coupling member 102 further includes a stop member 110, which extends around its proximal region 104. The stop member 110 has a frontal abutment face 112, substantially at the junction between the probe and the proximal region.

The through-bore 108 is defined by sidewalls 114, which are of substantially uniform thickness and sufficient to withstand the forces exerted by pressure of the fluid along the through-bore. As will be herein described, in use, the coupling assembly generates bending forces. The thickness of the sidewall in the region of the frontal abutment face 112 assists in resisting such bending forces.

The male coupling member 102 further comprises an external, annular sealing ring 115 close to the free end of the probe. The sealing ring 115 is seated within an annular groove, which extends circumferentially about the outside of the probe. The external diameter of the sealing ring is greater than the external diameter of the probe 106 in order that the sealing ring ensures a seal when the probe is inserted into the female coupling member 103.

A small diametrical through-hole 117 is provided in the probe closely adjacent to its distal end.

The male coupling member may be fabricated by any well-known manufacturing method, for example casting or machining from a block. Alternatively, it is preferable to machine the male member from a rod with the axis of the proximal end and probe coincident and excluding the through-bore. The rod can then be bent so that the axis of the proximal end and probe are inclined at the angle α before the through-bore is machined.

The female coupling member 103 comprises a body that includes a through-bore 121, which is of the same internal diameter as the through-bore 108 of the male coupling member 102, and a socket 122. The through-bore 121 and the socket 122 are both substantially circularly cylindrical and straight. An open-end region 124 of the female coupling member 103, which includes an aperture of the through-bore 121, is adapted to communicate with a second fluid passage (not shown). The axis of the socket 122 is coincident with the coupling axis A. The socket 122 is of size to snugly receive the probe of the male member 102.

The socket 122 comprises a closed bore that extends up to an end face 126. Disposed around the inside circumference of the socket, adjacent to its opening, is an internal, annular sealing ring 128. The annular sealing ring 128 is seated within an annular groove on the inside of the socket 122. The internal diameter of the sealing ring is less than the internal diameter of the bore of the socket such that, when the probe 106 is inserted into the socket 122, the sealing ring 128 ensures a seal with the cylindrical outer surface of the probe.

The end face 126 has a fluid egress aperture 130, whereby the socket is in communication with the ambient environment surrounding the female coupling member 103.

The through-bore 121 extends between the open-end region 124 and an aperture 132 in the circumferential wall of the socket 122. The aperture 132 is located between the internal annular sealing ring 128 and closed end of the socket.

The open-end region 124 is comprised of a substantially cylindrical rod that extends from the body of the female coupling member 103 and is co-axially aligned with the through-bore 121. In the open-end region 124, sidewalls 134 define the through-bore. The sidewalls 134 are of substantially uniform thickness and sufficient to withstand the forces exerted by pressure of the internal fluid.

The body of the female member 103 is such that, during use, all the walls are of sufficient thickness to withstand the forces exerted and in particular the herein described bending forces acting to straighten the socket and through-bore to lesser angles of interconnection.

A pair of small diametrically aligned through-holes 36 are provided in the walls of the socket adjacent to its distal end.

The female coupling member may be fabricated by any well-known manufacturing method, for example casting or machining from a block. Alternatively, it is preferable to fabricate the female member from two parts. A first part, which is machined from a rod and includes all the features that are radial and axial to the axis of the socket, and a second part comprising a rod or tube, which is attached to the first part. The axis of the second part is inclined to the first part and at the angle α. The second part may be joined by any well-known method that creates a sealed joint between the two parts. The through-bore can then be machined.

To effect coupling, the male and female coupling members are moved into the positions shown in FIG. 1, the probe 106 is then advanced along its axis (axis A), into the socket 122. During insertion the external annular sealing ring 115, located around the cylindrical external surface of the probe, is able to pass the internal annular sealing ring 128 located around the cylindrical internal surface of the socket as at least one ring, and generally both, is composed of a resilient elastomeric material.

When the probe is fully inserted into the socket 22 along coupling axis A, the abutment of the stop member 110 against the female coupling member 103 terminates the movement. In this position the through-bore 108 of the male coupling member is brought into coincidence with the through-bore 121 of the female coupling member i.e. they are aligned along flow axis B. As noted above these through-bores are of identical internal diameter, and when they are thus brought together they define a smooth, straight flow passage (see FIG. 2).

The fluid egress aperture 130 assists the insertion of the probe 6 into the socket 122. Before inserting the probe 106 into the socket 122, the socket contains the fluid of the ambient environment, for example air or seawater. As the probe is inserted into the socket the external sealing ring 115 forms a seal with the walls of the socket. Consequently ambient fluid is forced in the direction of the probe's movement, relative to the socket. A small amount of the ambient fluid contained within the socket may escape down the through-bore 124 of the female coupling member. However, once the sealing ring 16 passes the aperture 132 of the through-bore, the fluid can only exit from the socket through the egress aperture 130. It should be clear that the dimensions of the egress aperture 130 therefore determine the resistance force that arises on insertion of the probe 106.

In use, fluid, for example oil, water or a water-based liquid, flows through a conduit in the coupling assembly 101 under pressure. The conduit allows fluid to flow between the two fluid passages and substantially through the through-bores 108, 121 of the male and female coupling members 102, 103. However, at the intersection between the two bores and because the external diameter of the probe is less than the internal diameter of the socket, which is necessary in order to insert the probe into the socket, there is also fluid in the annular space between the probe and the socket. The external annular sealing ring 115, which forms a seal between the probe and the walls of the socket, prevents the fluid from escaping towards the closed end of the socket. The internal annular sealing ring 128, which forms a seal between the socket and the radial surface of the probe, prevents the fluid from escaping towards the open end of the socket. The fluid conduit therefore comprises the two through bores 108, 121 and the annular space delimited by the two sealing rings 115, 128.

The pressure of the fluid exerts an equal pressure on all the internal surfaces of the conduit. The fluid pressure creates the bending forces within the coupling assembly, which act to lessen the interconnection angle between axis A and B. The fluid pressure creates both separation forces and coupling forces. Thus, if the female coupling member is held stationary, the separation force is the product of the fluid pressure and the cross sectional area of the probe 106 at the internal sealing ring 128 and the coupling force is the product of the fluid pressure and the cross sectional area of the probe 106 at the external sealing ring 115. In the present embodiment, the arrangement of the seals is such that the coupling and separation forces create a net force that acts to urge or maintain the probe into the socket. Said net force therefore being a product of the fluid pressure and the cross sectional area of the annular space between the probe and the socket. It will be readily apparent that by arranging both the annular sealing rings either about the probe or about the socket, a zero net coupling force is achieved.

When the male and female coupling members are coupled together as shown in FIG. 2 the holes 117, 136 in those members are aligned with each other. A pin may be inserted through them, to help maintain the male and female members in coupled relationship. This helps to maintain the coupling when a separation force is inadvertently applied. On the other hand when a very large force is applied, that could if resisted lead to damage of the coupling assembly, the pin can fail and the male and female members separate. The force at which this occurs being the breakout force.

With reference to FIG. 3 and according to a second embodiment of the present invention, a coupling assembly 201 comprises at least one male coupling member 202 and a manifold 203. Each male coupling member is generally in accordance with the male coupling member of the previous embodiments and includes: a proximal region 204 arranged for communication with a first fluid passage (not shown); a probe 206, which is arranged coincident with a coupling axis A; a through-bore 208, which has an axis coincident with the flow axis B and extends between a first aperture on a distal end of the proximal region and a second aperture on a circumferential face of the probe; and an external sealing ring 215, which is arranged close to the free end of the probe.

According to the second embodiment each male coupling member further comprises a radial flange 216, a mechanical clip 217, and an alignment feature 210. The radial flange extends about the proximal region and includes upper and lower surfaces that are orthogonal to the flow axis B. A circumferential sidewall connects the upper and lower surfaces and is tapered towards the lower surface.

The mechanical clip 217 comprises a circular disc section 218 and two side sections 219, 220. The circular disc section comprises upper and lower faces and includes a central hole, thus resembling a washer. The two side sections are substantially identical and each is substantially part tubular in form. Each side section subtends an angle of approximately 90° about the disc section. The side sections extend axially from either side of the lower face of the disc section and from the outermost regions of the disc. The side sections and the adjoining disc section comprise substantially one part, which is formed from a resilient plastics material.

Each side section includes engaging means 219a, 220a. The engaging means comprise a rack of circumferential teeth of generally saw tooth form and are located on an outside aspect and close to the free end of each side section. In each rack of teeth, each tooth has a face that is orthogonal to the flow axis and a face that is oblique to the flow axis.

In use, the disc section of the clip locates about the proximal section and orthogonal to the flow axis, wherein the clip can slide longitudinally along the flow axis but is delimited towards the probe by abutment between the lower face of the disc and the upper face of the flange.

The distal end of each probe includes the alignment feature 210. The alignment feature comprises a flattened portion of the wall about the end region of the probe. The alignment feature further comprises a radial face and an axial face. As will be herein described the alignment feature ensures the correct alignment of the male coupling member and so is not symmetrical.

The manifold 203 includes at least one and preferably a plurality (not shown) of connection sites to correspond to each male coupling member. Each connection site contains features that are generally in accordance with the female coupling member of the previous embodiments and include: a through-bore 221, which is coincident with the flow axis B and extends from a first end that is arranged for communication with a second fluid passage (not shown); a socket 222 that is coincident with the coupling axis A; and an internal sealing ring 228, which is arranged close to the open end of the socket.

According to the second embodiment, each coupling site further includes a split pin 230 and engaging means comprising internal, radial teeth 236. The split pin 230 is housed in a circular hole that extends through the manifold and between the closed end region of the socket and the ambient environment. The circular hole is arranged orthogonal to the coupling axis A and at the edge of the socket. The split pin is housed fast in the hole. The pin is split so that fluid may enter the centre of the pin, thus creating a fluid egress path between the bottom of the socket and the ambient environment and operating generally in accordance with the fluid egress aperture of the previous embodiments.

The internal, radial teeth 236 comprise an axis that is coincident with the axis of the through-bore 221. The teeth are of general saw tooth form to correspond with the engaging means 219a, 220a of the mechanical clip.

The coupling assembly of the second embodiment is shown in the unmated position in FIG. 3. The male member is inserted into the socket of the manifold by relative movement along the coupling axis A. The probe is inserted until the probe abuts the split pin 230. As shown in FIG. 4, when the probe is correctly orientated, the axial face of the alignment feature passes the split pin, wherein said abutment occurs with the radial face of the alignment feature. When the probe is in the correct orientation the pin is arranged to delimit the relative movement when the through-bores in the male coupling member and the manifold are coincident. If the male member is not correctly orientated said abutment occurs between the distal end of the probe and the pin. When the distal end of the probe abuts the pin, the axis of the through bores in the male coupling member and manifold respectively are not aligned.

In order to insert the male member to the position shown in FIG. 4, the mechanical clip is moved axially along the flow axis B and away from the probe. When the probe is correctly inserted the axis of the mechanical clip is aligned with the axis of the internal, radial teeth 236 such that the mechanical clip can be slid axially along the flow axis B and towards the manifold. The two side sections of the mechanical clip, flex inwardly due to the resilient nature of the clip thus allowing the engaging means 219a, 220a to engage with the internal, radial teeth of the manifold. The clip is shown fully mated in FIG. 5, wherein the teeth of the clip and manifold engage. Said engagement resists relative movement between the clip and manifold away from each other. Furthermore, abutment between the clip and the radial flange of the male coupling member gives the coupling assembly breakout strength.

In use the coupling assembly works generally in accordance with the previous embodiments. If the breakout force is exceeded then the teeth of the mechanical clip are designed to shear such that the coupling comes apart. Alternatively, to uncouple the assembly in a controlled manner, the free end of the side sections of the mechanical clip can be forced toward each other such that the teeth are removed from engagement and the clip slid away from the manifold.

Figure 6:
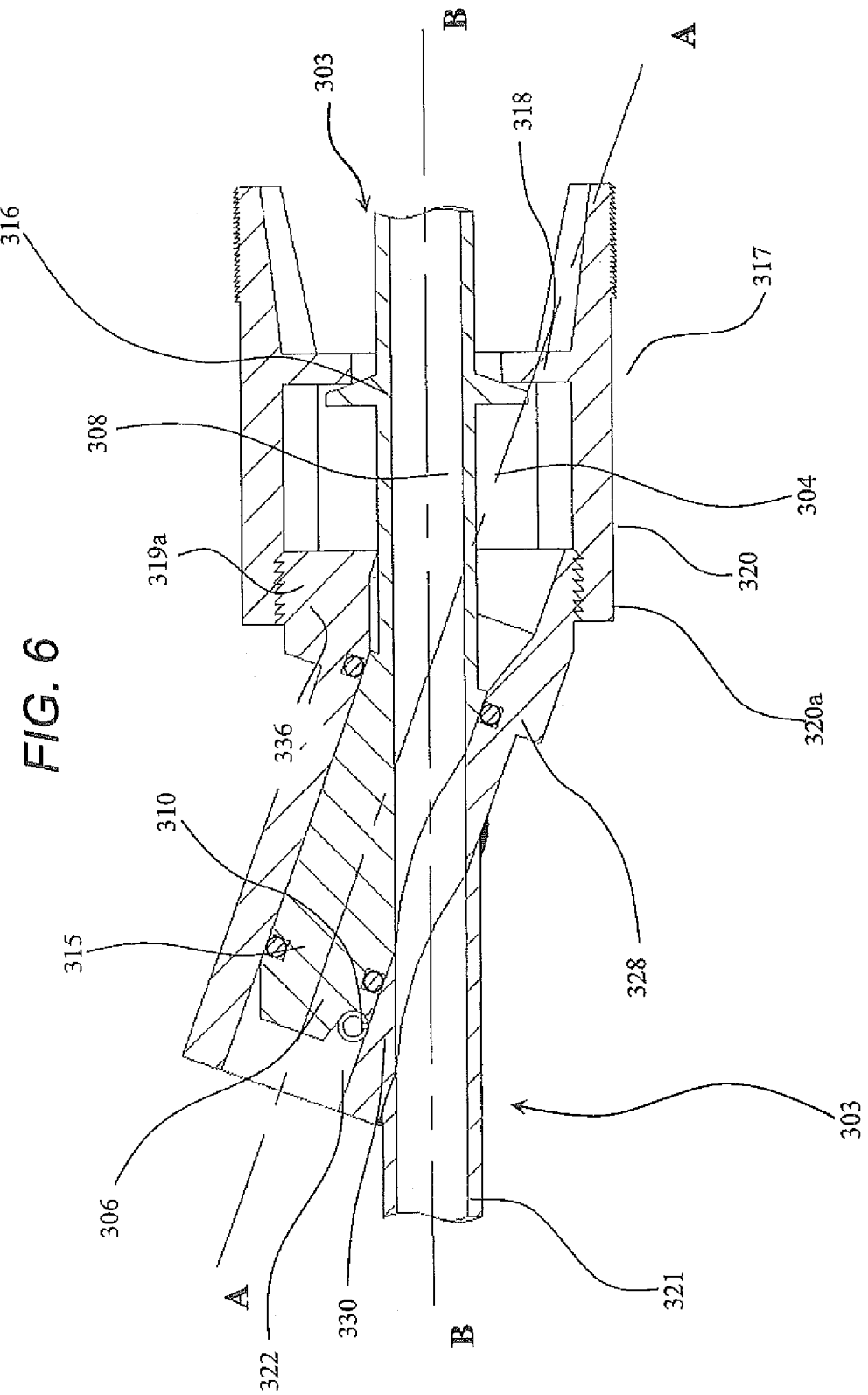
FIG. 6 is a schematic cross-sectional view of a third embodiment of the present invention in a mated position, wherein the position is secured.
Figure 13:
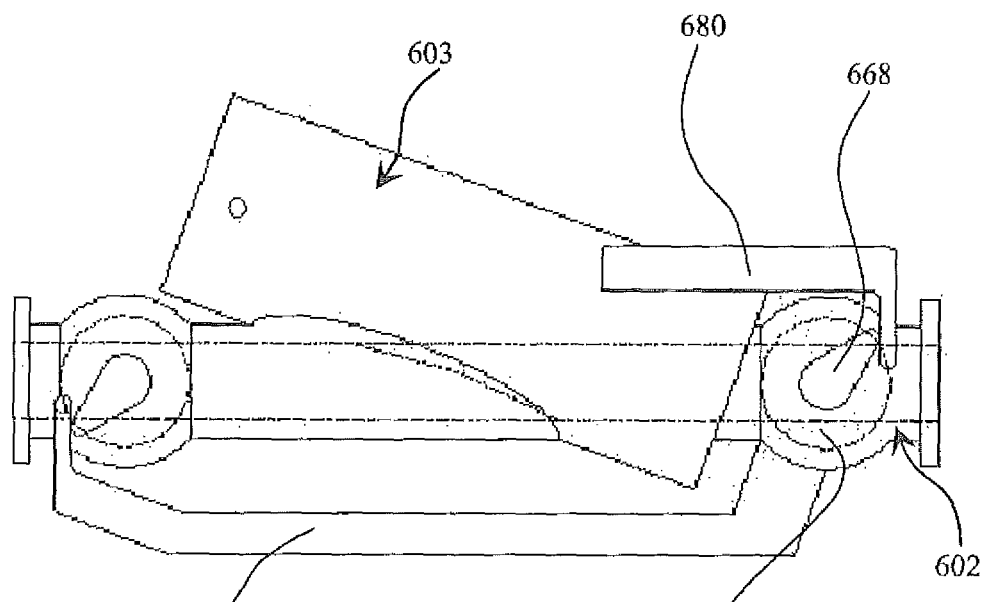
FIG. 13 is a side view of a sixth embodiment of the present invention in a mated position.
Figure 14:
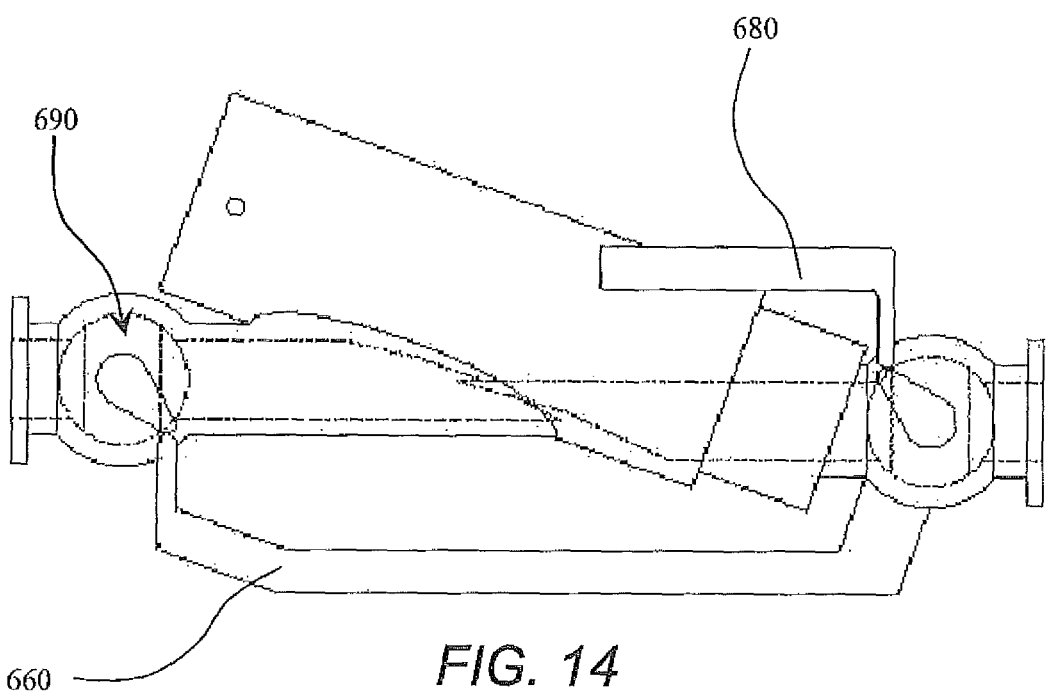
FIG. 14 is a side view of the sixth embodiment of the present invention in a mid-coupled position.
Figure 15:
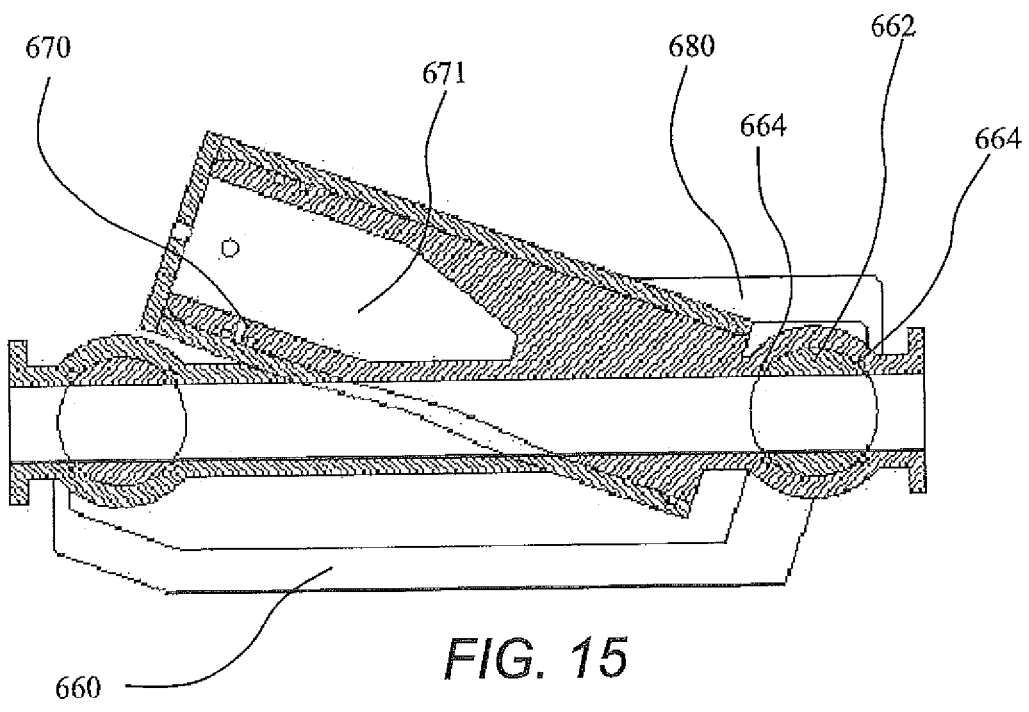
FIG. 15 is a cross-sectional side view of the sixth embodiment of the present invention in the mated position.
Figure 16:
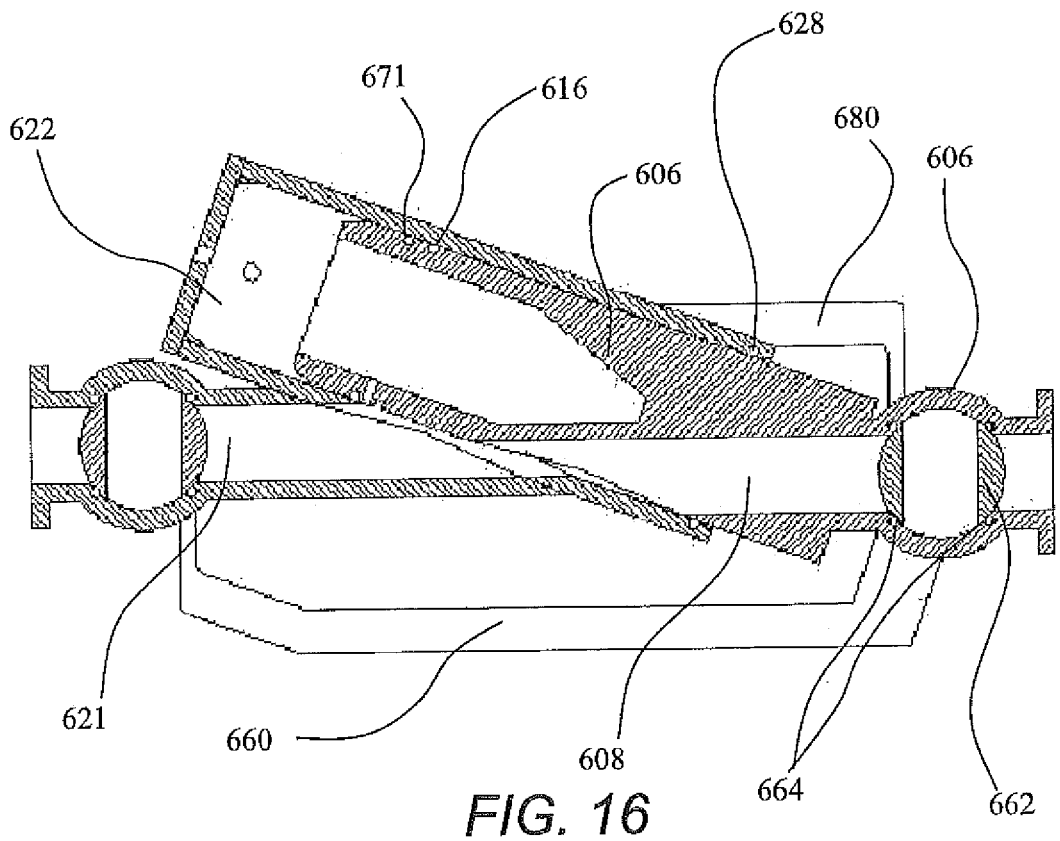
FIG. 16 is a cross-sectional side view of the sixth embodiment of the present invention in the mid-coupled position.

According to the third embodiment of the present invention and as shown in FIG. 6, the coupling assembly comprises a male coupling member 302 and female coupling member 303. The male coupling member is generally in accordance with the male coupling member of the second embodiment and comprises a proximal region 304 arranged for communication with a first fluid passage (not shown); a probe 306, which is arranged coincident with a coupling axis A; a through-bore 308, which has an axis coincident with the flow axis B and extends between a first aperture on a distal end of the proximal region and a second aperture on a circumferential face of the probe; an external sealing ring 315, which is arranged close to the free end of the probe; a radial flange 316, which extends radially from the proximal region; an alignment feature 310, which is formed in the distal end of the probe; and a mechanical clip 317, which is slidably mounted about the proximal region of the male member.

The mechanical clip of the third embodiment comprises a circular disc section 318 and two side sections 319, 320. The side sections differ from that described in the second embodiment in that the circular disc section joins the two side sections at a mid section rather than at their ends. The side sections therefore having a first end that extends from one side of the circular disc section and a second end that extends from the opposite side. The side sections differ further from that described in the second embodiment, in that the engaging means 319a, 320a comprising a rack of circumferential teeth of generally saw tooth form are located on an inside aspect of the side sections rather than the outside aspect. The engaging means are located on the first end of the side sections.

The radial flange 316 differs from that described in the second embodiment in that it comprises a lower face, which is orthogonal to the axis of the coupling assembly, and an oblique upper face.

The female coupling member is generally in accordance with the female coupling member of the first embodiment and comprises: a through-bore 321, which is coincident with the flow axis B and extends from a first end that is arranged for communication with a second fluid passage (not shown); a socket 322 that is coincident with the coupling axis A; and an internal sealing ring 328, which is arranged close to the open end of the socket. The female member further comprises a split pin 330 generally in accordance with the split pin described in the second embodiment, which is arranged in the socket, and engaging means, which differs from the engaging means described in the second embodiment in that the engaging means comprises external, radial teeth 336.

The external, radial teeth 336 comprise an axis that is coincident with the axis of the through bore 321. The teeth are of generally saw tooth form to correspond with the engaging means 319a, 320a of the mechanical clip.

The coupling assembly of the third embodiment is mated substantially as described in the mating of the second embodiment. The teeth of the mechanical clip engage with the rack of teeth on the female member by flexing outwardly. When engaged, the teeth inhibit relative movement between the clip and female coupling member in an uncoupling direction. Abutment between a lower face of the circular section comprising the clip and the oblique upper face of the flange inhibits decoupling of the coupling members. In use, the clip therefore provides breakout strength.

If the breakout strength is exceeded, the teeth of the clip are designed to shear, thus allowing the probe to be unmated. The breakout strength is enhanced due to the geometry of the oblique upper face of flange 326 resulting in the side sections bending inwardly as the male and female members are pulled apart. The clip may be removed deliberately by squeezing the second ends of the side sections inwardly such that the first ends are forced outwardly and away from engagement with the radial teeth.

According to a fourth embodiment and as shown in FIGS. 7 and 8, a coupling assembly comprises male and female coupling members. The male coupling member 402 is generally in accordance with the male coupling member of the previous embodiments and comprises: a proximal region 404 arranged for communication with a first fluid passage (not shown); a probe 406, which is arranged coincident with a coupling axis A; a through-bore 408, which has an axis coincident with the flow axis B and extends between a first aperture on a distal end of the proximal region and a second aperture on a circumferential face of the probe; and an external sealing ring 415, which is arranged close to the free end of the probe.

The probe of the male coupling member is substantially less elongate then previous embodiments and extends minimally from the proximal region sufficient only so that the external outer sealing ring can be seated between the distal end of the probe and the aperture of the through bore. Furthermore, the distal end of the probe is in a plane that is parallel to the flow axis B, rather than radial to the coupling axis A as shown in the previous embodiments. The external annular sealing ring 415 is also arranged in a plane parallel to the flow axis B, rather than radial to the coupling axis A as previously described.

The male coupling member further comprises a plate 417. The plate extends radially from the proximal region and includes a hole 418. The hole extends through the plate and is arranged such that the axis of the hole is orthogonal to the flow axis B.

The female coupling member is generally in accordance with the female coupling assembly of the previous embodiment and comprises; a through-bore 421, which is coincident with the flow axis B and extends from a first end that is arranged for communication with a second fluid passage (not shown); a socket 422 that is coincident with the coupling axis A; and an internal sealing ring 428, which is arranged close to the open end of the socket.

The socket of the female coupling member is substantially less elongate than that described in previous embodiments and corresponds with the size of the probe. The female coupling member further comprises a plate 436 that extends axially from the aperture of the socket. The plate includes a hole 437 that extends through the plate and which has an axis orthogonal to the flow axis B of the through bore within the female member.

When mated in use, the external annular sealing ring 415 creates a seal between the socket and probe that lies in a plane parallel to the flow axis B and spaced outwardly from the extent of the through bores 421, 408. Furthermore, when mated in use, the plates 417, 436 are arranged with part of their free ends overlapping each other such that the holes 417, 436 are aligned. A pin (not shown) can be inserted through the holes to provide breakout strength to the coupling. Said pin operating generally in accordance with the pin described in the first embodiment.

The coupling assembly operates, in use, substantially as herein described in the previous embodiments. The advantage of the fourth embodiment is that the coupling assembly retains a mainly cylindrical profile such that the coupling assembly may be arranged inside a second pipe or fluid conduit.

According to a fifth embodiment of the present invention and with reference to FIGS. 9-12, a coupling assembly comprises male and female coupling members. The male coupling member is generally in accordance with the male coupling member of the previous embodiments and comprises: a proximal region 504 arranged for communication with a first fluid passage (not shown); a probe 506, which is arranged coincident with a coupling axis A; a through-bore 508, which has an axis coincident with the flow axis B and extends between a first aperture on a distal end of the proximal region and a second aperture on a circumferential face of the probe; and an external sealing ring 515, which is arranged close to the free end of the probe.

The male coupling member further comprises first 540 and second 541 coupling arms which are arranged on opposite sides of the probe. Each coupling arm extends from a side aspect of the proximal section. Each arm is substantially circular and comprises a corresponding axis that is aligned parallel to the coupling axis A. A free end of each arm includes a plurality of notches 543 that are arranged spaced apart and along the axis of the arm. The or each notch contains a first and second face. The first face is spaced nearest the free end and is orthogonal to the axis of the arm. The second face is oblique to the axis, such that a V-shape is formed. The region of the arm extending from the proximal section is frusto-conical in shape and arranged so that it tapers towards the free end of the arm. A second region of the arm extending between the frusto-conical region and the free end is substantially circularly cylindrical.

The female coupling member is generally in accordance with the female coupling member of previous embodiments and comprises: a through-bore 521, which is coincident with the flow axis B and extends from a first end that is arranged for communication with a second fluid passage (not shown); a socket 522 that is coincident with the coupling axis A; and an internal sealing ring 528, which is arranged close to the open end of the socket.

The female coupling member is substantially wider than that described in previous embodiments and further includes a first 550 and second 551 alignment holes. The alignment holes are arranged on either side of the socket and are substantially cylindrical. Each of the alignment holes 551 extend parallel to the coupling axis A and in a plane to the socket. The end region extending from a face containing the open end of the socket is frusto-conical such that the aligned hole tapers away from the face. A second region of the alignment holes is substantially circularly cylindrical and extends between the frusto-conical section and a face containing an aperture of a fluid egress aperture 530, the fluid egress aperture being generally in accordance with the fluid egress aperture described in the first embodiment. Since the alignment hoes are parallel with the socket they are not intersected by the socket or through-bore.

The female coupling member further comprises a locking means 554. The locking means comprises a first and second pin which are spaced from each other and joined by a plate at their distal ends. The pins 555 extend from the plate in a common plane. The free end of each pin is angled to form an oblique end face. The pins of the locking means are inserted into two holes formed in the female member. The holes are arranged either side of the through-bore and socket. Said holes further being arranged such that they intersect each alignment hole respectively. Said holes extending upwardly from the intersection with the alignment holes and an outer surface of the female coupling member.

The weight of the locking means biases the pins 555 downwardly, thus when uncoupled, as shown in FIG. 10, the pins abut the internal boundary of the alignment holes.

The alignment pins ensure that the male coupling member is correctly oriented so that the two through-bores are aligned and form a straight fluid flow. The probe is inserted into the socket by relative movement along the coupling axis A. As shown in FIG. 11, the alignment pins initially engage with the frusto-conical region of the alignment holes in the female coupling member. This reduces the tolerance of the original rotational alignment. As the probe is further inserted into the socket the alignment arms engage in sliding contact with the alignment holes.

As the alignment arms reach the intersection of the pins 555 with the alignment holes, the alignment arms abut the oblique end face of the pins and through further relative movement forces the pins upwardly and out of the alignment holes. When the coupling members are mated in use, a stop member of the male coupling member, which is generally in accordance with the stop member described in the first embodiment, abuts the face of the female coupling member. At this point, the pins of the locking means are aligned with the notches in the alignment arms. Under the weight of the locking means the pins therefore engage with the notches.

Each pin 555 of the locking means provide breakout strength to the assembly. The probe is inhibited from being removed from the socket by abutment of the pins and orthogonal ends of the notches. If the breakout force is exceeded, the tips of the pins are designed to fail such that the probe can be removed from the socket.

According to the sixth embodiment and with reference to FIG. 13-16, a coupling assembly comprises a male 602 and female 603 coupling members.

The male coupling member is generally in accordance with the male coupling member of previous embodiments and comprises: a proximal region 604 arranged for communication with a first fluid passage (not shown); a probe 606, which is arranged coincident with a coupling axis A; a through-bore 608, which has an axis coincident with the flow axis B and extends between a first aperture on a distal end of the proximal region and a second aperture on a circumferential face of the probe; and an external sealing ring 615, which is arranged close to the free end of the probe.

The male coupling member further comprises a valve, an arm 660 and fluid release means. The valve 662 comprises any well-known valve and in particular, although by no means limited to, a ball valve, which is rotatable between an open position and a closed position. The valve is housed in the proximal region of the probe and is arranged orthogonal to the flow axis B. The valve intersects the axis of the through-bore such that in the open position the valve creates a straight fluid conduit in accordance with previous embodiments. Sealing means 664 ensures fluid cannot escape the through-bores via the valve. The valve is closed by rotating the valve through 90°.

The valve further comprises a plate 668 that is held fast to the top of the valve and on the outside of the coupling member. The plate includes a first straight edge and a rounded distal end. Wherein, in use and in the closed position, the first edge is arranged parallel to the coupling axis A.

The arm 660 comprises a first section that is arranged parallel with the flow axis and a second section that is arranged at 90° to the first section. The arm extends from the outside of the proximal region.

The fluid release means comprises a fluid conduit that extends between the distal end of the probe and an aperture on the side face of the probe. The fluid conduit comprises a small diameter hole 670 that extends from the aperture on the side of the probe and orthogonal to the probe axis. The small diameter hole connects to a large diameter recess 671 that extends along the axis of the probe and from the distal end in order to reduce the weight of the probe. The small diameter hole is arranged on the probe between its distal end and the external annular sealing ring 616. A further annular sealing ring 671 is arranged about the probe and between the distal end of the probe and the small diameter hole. When mated in use, the external annular sealing ring 616 and further annular sealing ring 671 seal the probe with the socket.

The female coupling member is generally in accordance with the female coupling members of previous embodiments and comprises: a through-bore 621, which is coincident with the flow axis B and extends from a first end that is arranged for communication with a second fluid passage (not shown); a socket 622 that is coincident with the coupling axis A; and an internal sealing ring 628, which is arranged close to the open end of the socket.

The female coupling member further comprises a valve 690 and an arm 680. The valve 690 is the same as the valve of the male coupling member and is arranged between the first fluid conduit and the intersection of the through-bore and socket. The arm 680 comprises a first section, which is arranged parallel to the flow axis B and extends from the outside of the socket, and a second section which is arranged at 90° to the first section.

When uncoupled, the valves of the male and female coupling members are in the closed position such that fluid cannot escape from the ends of the coupling members. As the probe is inserted into the socket the free end of each of the arms slides along the first edge of each plate on the top of the respective valves. During insertion the valves are not rotated and remain in the closed position. Once inserted in use, rotating the plates such that the first edge of each plate moves toward the second region of each respective arm opens the valves. For example, the plate of the valve on the male member moves towards the second region of the arm on the female member. The rotation of the valves is delimited in the open position by abutment of the plates and arms.

When decoupling, relative movement between the coupling members causes each arm to rotate the respective plates towards the closed position. Decoupling of the coupling members continues the relative movement and therefore the closing rotation of the valves, such that the valves are in the closed position when the aperture of the fluid release becomes connected to the through-bore of the female member and immediately before the through-bore of the male member passes the internal annual sealing ring. When said position is reached the fluid trapped in the through-bores and between the closed valves can escape through the fluid release conduit and into the ambient environment. When the valves are in the closed position the first edge of each plate is again aligned parallel with the coupling axis A such that the arms do not further rotate the valves.

The advantage of the sixth embodiment is that the ends of the coupling members are closed off before the through-bore of the male member becomes unsealed with the through-bore of the female member. Such an arrangement means that even under hot breaking conditions where the coupling members are forced apart, fluid does not "spit" from the ends of the coupling members. Furthermore, under such uncoupling, the coupling members are not forced apart by the pressure of the fluid egressing from the coupling members.

Figure 17:
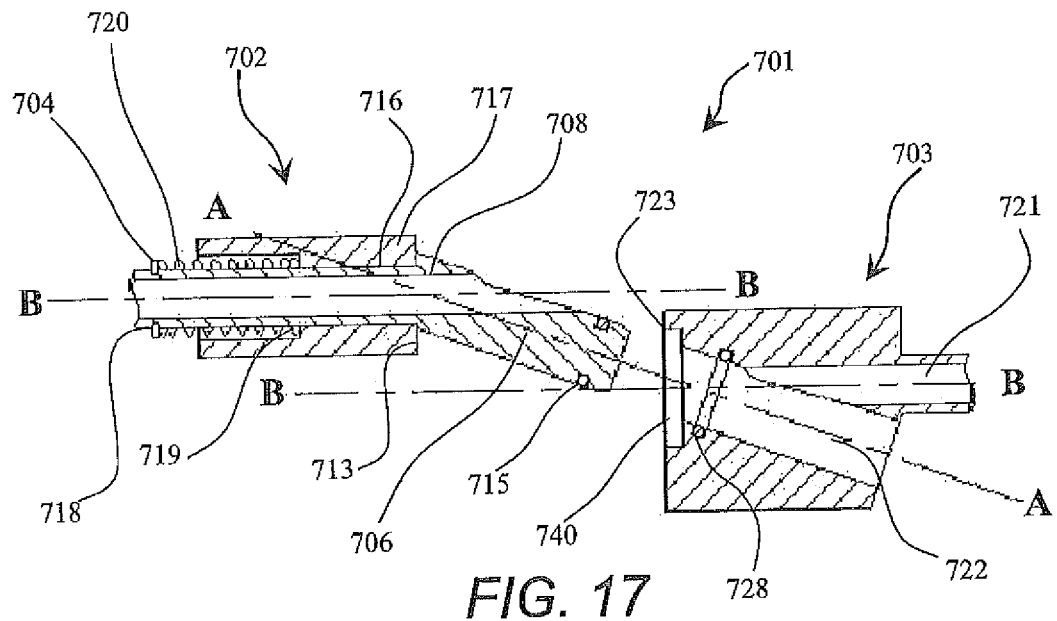
FIG. 17 is a cross-sectional side view of a seventh embodiment of the present invention in an unmated position.
Figure 18:
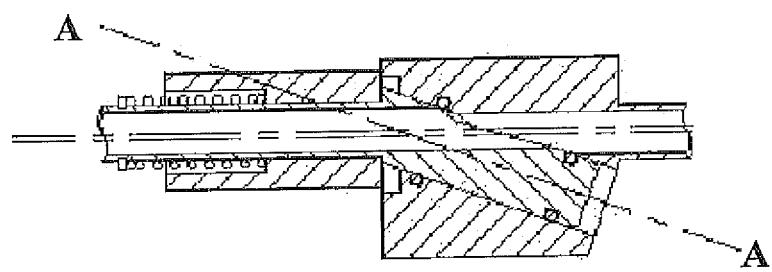
FIG. 18 is a cross-sectional side view of the seventh embodiment in a near-mated position.
Figure 19:
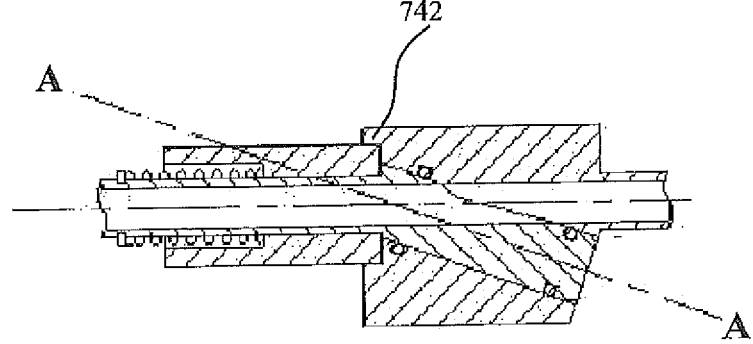
FIG. 19 is a cross-sectional side view of the seventh embodiment in a mated position.

In a seventh embodiment, and with reference to FIGS. 17 to 19, a coupling assembly 701 comprises a male 702 and a female 703 coupling member substantially in accordance with the first embodiment.

FIG. 17 shows the coupling assembly 701 uncoupled. In accordance with the first embodiment, the male member 702 includes: a proximal region 704 arranged for communication with a first fluid passage (not shown); a probe 706, which is arranged coincident with a coupling axis A; a through-bore 708, which has an axis coincident with the flow axis B and extends between a first aperture on a distal end of the proximal region and a second aperture on a circumferential face of the probe; and an external sealing ring 715, which is arranged close to the free end of the probe.

The male coupling member 702 comprises a first inner part, which comprises the probe, and also a tube section 716 that extends from the probe and is coincident to the flow axis B. The external diameter of the tube is less than the external diameter of the probe, such that a hip 713 is formed at the intersection. The end of the tube section remote from the probe comprises the proximal region 704 that connects with the first fluid passage (not shown). The proximal region further comprises a radial groove within which a removable stop member 718 can be secured fast to the tube section.

The second part forms a sleeve 717 about the outside of the tube section of the inner part. The sleeve comprises a thick-walled hollow rod with a through bore coincident with its axis. The through bore has a step 719, such that its internal diameter in the proximal region 704 is larger than in its region adjacent to the probe. In the latter region the bore fits snugly about the tube section. The step 719 is formed at 90° to the axis B.

The sleeve is arranged about the tube by removing the stop member 718 and sliding the sleeve onto the tube section. A spring 720 is also arranged about the tube. A first end of the spring abuts the stop member 718 and a second end of the spring abuts the step 719 of the sleeve such that the sleeve is urged to abut the hip 713.

In accordance with the first embodiment, the female coupling member 703 comprises: a through-bore 721, which is coincident with the flow axis B and extends from a first end that is arranged for communication with a second fluid passage (not shown); a socket 722 that is coincident with the coupling axis A; and an internal sealing ring 728, which is arranged close to the open end of the socket.

The female coupling member 703 further comprises a circular or disc-shaped recess 740 formed in the face 723 of the coupling member, and forming the open end of the socket. The recess 740 is coincident with the flow axis B in the assembled device (FIG. 19) and is sized appropriately so as to accommodate snugly the forward end of the sleeve of the male coupling member, as shown in FIG. 19.

The probe of the male coupling member can be inserted into the socket of the female coupling member until a near-mated position shown in FIG. 18 is reached, where the sleeve abuts the face 723, but is not within the recess 740. To complete the insertion of the probe, the sleeve is urged to slide toward the stop member 718, against the action of the spring 720. As shown in FIG. 19, when the probe is inserted such that the two through bores are aligned, the sleeve can locate in the recess 740. The spring keeps the sleeve within the recess and in abutment with the hip.

When coupled, as shown in FIG. 19, the probe is prevented from being withdrawn from the socket by engagement of the forward end of the sleeve in the recess 740, aided by the spring 720. In order to break the coupling apart unintentionally, for example by means of excess fluid pressure in the fluid passages or mechanical dislodgement, the corner 742 of the female member would have to fracture from the coupling member. Breakout strength is therefore provided. However intentional uncoupling is achieved easily. Sleeve 717 is withdrawn from recess 740, against the spring force. The corner is thereby cleared; it is no longer an abutment obstructing the sleeve. The withdrawal movement may be continued.

In an eighth embodiment and with reference to FIGS. 20 and 21, a coupling assembly 801 comprises male 802 and female 803 coupling members. The coupling assembly is substantially in accordance with the first embodiment except that the external sealing ring is replaced by a second internal sealing ring 815 that creates a seal between a probe and a socket (as in the first embodiment), and the probe and socket has a varying diameter rather than a constant diameter.

The female coupling member is substantially in accordance with the first embodiment and comprises a through-bore 821, which is coincident with the flow axis B and extends from a first end that is arranged for communication with a second fluid passage (not shown); a socket 822 that is coincident with the coupling axis A; and an internal sealing ring 828, which is arranged close to the open end of the socket.

The male coupling member is substantially in accordance with the first embodiment and includes a proximal region 804 arranged for communication with a first fluid passage (not shown); a probe 806, which is arranged coincident with a coupling axis A; and a through-bore 808, which has an axis coincident with the flow axis B and extends between a first aperture on a distal end of the proximal region and a second aperture on a circumferential face of the probe.

The socket 822 includes a constant diameter section, between the first 815 and second 828 internal sealing rings. However, immediately adjacent the first sealing ring 815, towards the closed end of the socket, the diameter of the socket decreases; and immediately adjacent the second sealing ring 828, towards the open end of the socket, the diameter of the socket increases. The profile of the probe matches that of the socket such that, as seen in FIG. 21, when the coupling is mated the probe fits snugly within the socket.

In use, the tapering of the respective socket and probe adjacent to the sealing rings prevents the sealing rings from being extruded out of their seatings due to the pressure of the fluid.

Figure 22:
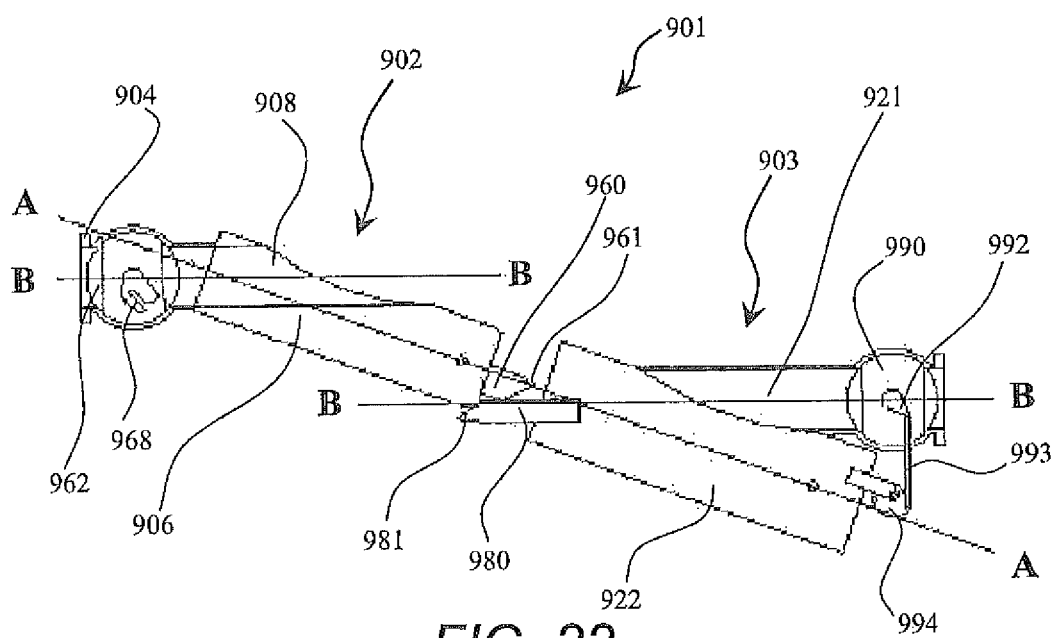
FIG. 22 is a side elevation view of a ninth embodiment of the present invention in an unmated position.
Figure 23:
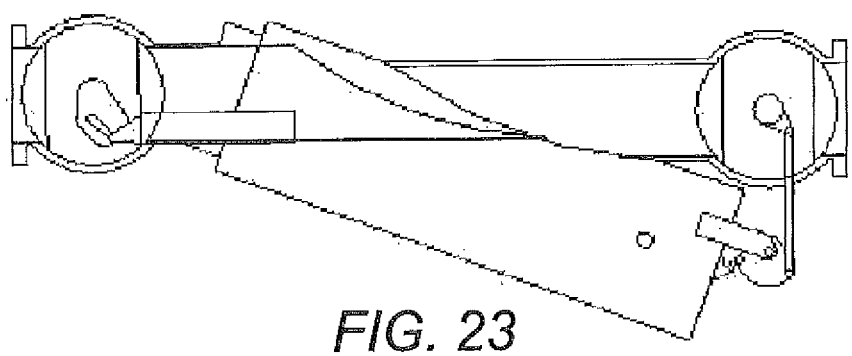
FIG. 23 is a side elevation view of the ninth embodiment in a near-mated position.
Figure 24:
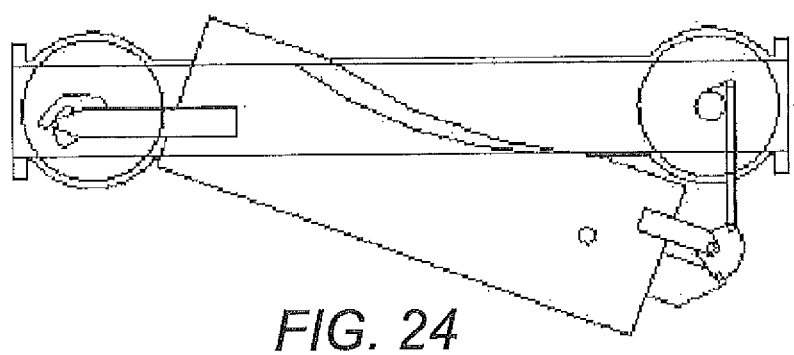
FIG. 24 is a side elevation view of the ninth embodiment in a mated position.

In a ninth embodiment, and with reference to FIGS. 22 to 24, a coupling assembly 901 comprises a male 902 and a female 903 coupling member, generally in accordance with the sixth embodiment.

FIG. 22 shows the coupling assembly uncoupled. The male coupling member 902 includes: a proximal region 904 arranged for communication with a first fluid passage (not shown); a probe 906, which is arranged coincident with a coupling axis A; a through-bore 908, which has an axis coincident with the flow axis B and extends between a first aperture on a distal end of the proximal region and a second aperture on a circumferential face of the probe; an external sealing ring 915, which is arranged close to the free end of the probe; and a valve 962 which is rotatable between a closed position (FIG. 22) and an open position (FIG. 24).

The valve comprises a plate 968 that is held fast to the top of the valve and on the outside of the coupling member. The outline perimeter of the plate includes a first edge that is substantially flat and an opposing second edge that is arcuate. When the valve is in the closed position, the straight edge is arranged perpendicular to the flow axis B and the end of the arcuate edge furthest from the pivot point of the plate (the centre axis of the valve) is provided to the coupling axis A. The centre axis of the valve is arranged substantially in line with the straight edge.

The male coupling member further comprises an arm 960 that extends from the distal end of the probe in line with axis A. A pin 961 extends from the end of the arm. The pin is parallel with the axis of the valve.

The female coupling member 903 includes: a through-bore 921, which is coincident with the flow axis B and extends from a first end that is arranged for communication with a second fluid passage (not shown); a socket 922 that is coincident with the coupling axis A; an internal sealing ring 928 (not shown), which is arranged close to the open end of the socket; and a valve 990 such as any well known ball valve.

The valve is operated by a series of pivoted links. A first link 992 is attached fast to the valve. An intermediate link 993 is pivotably attached to the first link at a location offset from the axis of the valve. The opposite end of the intermediate link is pivotably attached to an operable member 994. The operable member rotates about a point that is fixed with respect to the female member 903 and located on a bar that extends from the body of the female member. The intermediate link is pivotably connected to the operable member offset from its axis of rotation. The offset is the same as that between the offset between the intermediate link and axis of the valve, such that when the operable member rotates so does the valve.

The operable member is substantially similar to the plate 968 of the male member and has a straight edge and opposing arcuate edge. When the valve 990 is closed, as shown if FIG. 1, the straight edge is oblique to the coupling axis and the end of the arcuate edge furthest from the axis of rotation is parallel to the coupling axis B.

The female member includes an arm 980 that extends from the outside of the body of the female member. A pin 981 extends from the distal end of the arm and parallel to the axis of the valves.

To couple the assembly, the probe is inserted into the socket along the coupling axis until a first position, as shown in FIG. 23, in which the pins 981, 961 abut the straight edge of the plate 968 and operable member 994 respectively. At this position the valves are still closed. As the probe is inserted further, the valves are opened until, when in a second position as shown in FIG. 24, the through bores are aligned and the valves opened.

The opening of the valves is substantially similar and will be described herein with reference to valve 990 only. As the probe is inserted further, the pin moves in relation to the valve parallel to the coupling axis. The pin therefore remains in abutment with the straight edge but moves firstly toward the pivot point and then away as is necessary to rotate the plate and consequently open the valve. During decoupling, the pin moves relative to the plate parallel to the coupling axis B. At first the pin moves freely of the plate before abutting the opposing arcuate face. During further decoupling, the plate moves firstly toward the pivot point and then away as is necessary to rotate the plate and consequently close to the valve. When the valve is closed the pin moves past the end of the arcuate edge that is parallel to the coupling axis A and the probe decoupled.

A significant advantage of the embodiment is that the coupling and decoupling of the members opens and closes the valves respectively without any further intervention.

In a tenth embodiment and with reference to FIGS. 25 to 26, a coupling assembly 1001 comprises a male 1002 and a female 1003 coupling member As with the seventh embodiment, the male member 1002 comprises an inner part and a sleeve 1017.

The inner part includes: a proximal region 1004 arranged for communication with a first fluid passage (not shown); a probe 1006, which is arranged coincident with a coupling axis A; a through-bore 1008, which has an axis coincident with the flow axis B and extends between a first aperture on a distal end of the proximal region and a second aperture on a circumferential face of the probe; and an external sealing ring 1015, which is arranged close to the free end of the probe.

The sleeve is slidably mounted about the proximal region of the first part and urged by spring 1020 towards the probe and abutment with a hip 1013 formed at the intersection of the probe and proximal region.

As with the seventh embodiment, the female coupling member 1003 comprises: a through-bore 1021 which is coincident with the flow axis B and extends from a first end that is arranged for communication with a second fluid passage (not shown); a socket 1012 that is coincident with the coupling axis A; an internal sealing ring 1028, which is arranged close to the open end of the socket; and a disk-shaped recess 1040, which is formed in an end face of the coupling member that forms the open end of the socket.

The disk-shaped recess 1040 is defined by a semicircular protrusion integrally formed with the female coupling member and an opposing semicircular washer piece 1041. The semicircular washer piece is separate to the female coupling member. The semicircular washer piece is arranged on the female coupling member and relative to the semicircular protrusion such that they combine to form a circular ridge. The axis of the circular ridge is coincident with axis B. The centre of the circular ridge forms the disk-shaped recess 1040 with the through-bore 1021 in the centre. The washer piece 1041 is held to the semicircular protrusion on the coupling member by a retaining member 1042.

Retaining member 1042 comprises a spring or band type arrangement consisting of a number of turns. The spring or band has a diameter substantially the same as the diameter of the circular protrusion. As such, the spring or band fits snugly about the semicircular protrusion and the semicircular washer piece and thereby secures the semicircular washer piece is firmly to the coupling member.

The male coupling member can be inserted into the socket of the female coupling member substantially as previously described with reference to the seventh embodiment. During insertion to the fully coupled position, as shown in FIG. 25a, the retaining spring or band and the washer piece do not substantially move.

As previously described with reference to the seventh embodiment, in the mated position, as shown in FIG. 25a, the probe is prevented from being withdrawn from the socket by engagement between the sleeve and washer piece. However, at a predetermined breakout force the retaining spring expands radially thereby allowing the washer piece to move radially away from the fixed semicircular protrusion, which allows the male coupling member to decouple. Due to the resilient nature of the retaining spring, after disengagement, the retaining spring returns to its original size. This resiliency thereby returns the washer piece back to its position in abutment with the semicircular protrusion. When the cause of the breakout force has been removed, the probe may then be inserted into the socket and the coupling re-coupled. The retaining spring thereby provides breakout strength to the coupling.

Intentional de-coupling of the male and female coupling members can be easily achieved by withdrawing the sleeve from the disk-shaped recess, as previously described with reference to the seventh embodiment.

The advantage of such an embodiment is that breakout strength is achieved without destructively damaging either of the male or female coupling members or any part thereof. The resilient nature of the retaining member also allows easy re-coupling after a breakout incident.

Figure 27:
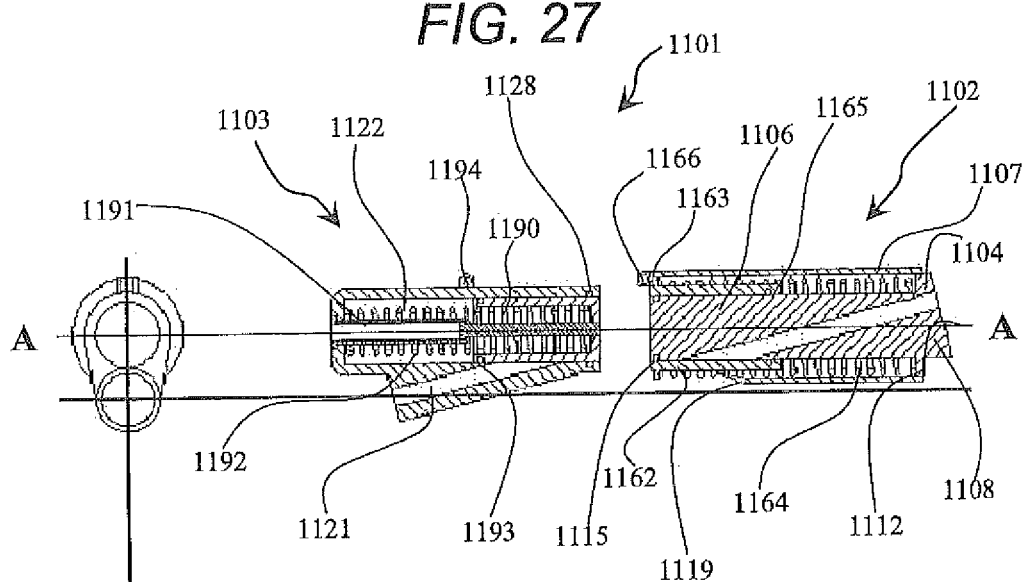
FIG. 27 is a schematic cross-sectional side view of an eleventh embodiment of the present invention in an un-mated position.
Figure 28:
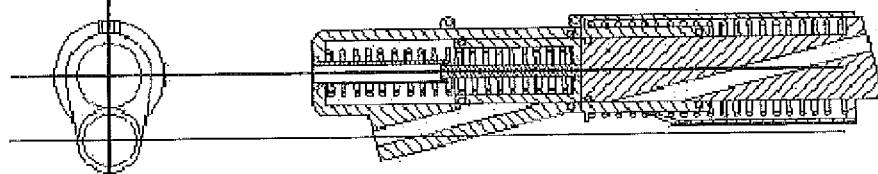
FIG. 28 is a schematic cross-sectional side view of the eleventh embodiment in a near-mated position.
Figure 29:
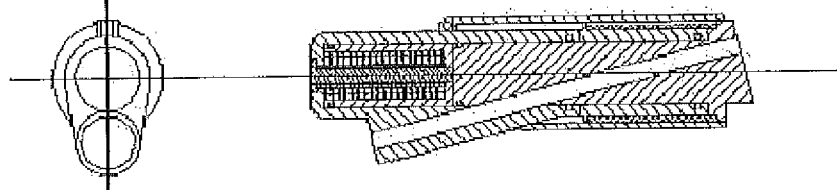
FIG. 29 is a schematic cross-sectional side view of the eleventh embodiment in a mated position.

In an eleventh embodiment, and with reference to FIGS. 27 to 29, a coupling assembly 1101 comprises a male 1102 and a female 1103 coupling member.

FIG. 27 shows the coupling assembly uncoupled. In accordance with the first embodiment, the male coupling member 1102 includes: a proximal region 1104 arranged for communication with a first fluid passage (not shown); a probe 1106, which is arranged coincident with a coupling axis A; a through-bore 1108, which has an axis coincident with the flow axis B and extends between a first aperture on a distal end of the proximal region and a second aperture on a circumferential short face of the probe; and an external sealing ring 1115, which is arranged close to the free end of the probe.

The male coupling member 1102 comprises a radial flange, which is arranged at the intersection of the proximal region and the probe and includes a frontal abutment face and a circumferential face. A sheath member 1107 is attached fast to the male coupling member and secured at the circumferential face of the radial flange. The sheath member 1107 comprises a substantially tubular section and extends parallel to the coupling axis A. The sheath extends from the radial flange and towards the free end of the probe. The distal end of the probe and the distal end of the sheath terminate in the same plain. An internal radial flange extends from the distal end of the sheath and towards the centre axis.

A semicircular hole 1119 is formed through the sheath and arranged at the distal end region. The hole has a centre axis that is coincident with the flow axis B. As will become clear later, the hole is sized so as to accommodate the female coupling member.

On an opposing side of the sheath to the hole, an engaging feature extends parallel to the coupling axis A and from the distal end of the sheath. The engaging means 1166 comprises a plate with a through-hole that is perpendicular to the coupling axis A.

A closing member 1162, comprising a tubular section, is slidably mounted on the end of the probe. The closing member includes an externally extending radial flange 1163 that is arranged off-set from one end of the closing member. The off-set corresponds to the thickness of the internal radial flange of the sheath.

A biasing means such as a spring 1164 is arranged in the radial space created between the sheath and probe. The spring acts at one end on the frontal abutment face 1112 and on the other end acts on the external radial flange of the closing member. The spring biases the closing member to a closed position as shown in FIG. 27, wherein the closing member is biased towards abutment between the external radial flange of the closing member and the internal radial flange of the sheath. In the closed position the end of the sheath, closing member and probe form a flat face.

In the closed position the first external annular sealing ring 1115 is located between the distal end of the probe and the aperture through-bore 1108 and acts to seal the probe to the closing member. An internal sealing ring 1165, housed within an internal annular recess formed in the closing member and positioned on the other side of the aperture of the through-bore 1108, also acts to seal the probe and sheath. The arrangement of the two sealing rings, 1115 and 1065, seals fluid within the through-bore 1108.

As with the first embodiment, the female coupling member 1103 comprises: a through-bore 1121, which is coincident with the flow axis B and extends from a first end that is arranged for communication with a second fluid passage (not shown); a socket 1122 that is coincident with the coupling access A; and an internal sealing ring 1128, which is arranged close to the open end of the socket.

The female coupling member 1103 comprises an internal closing member 1190 that operates within the socket 1122 and a retaining member 1191 that retains the closing member within the socket.

The retaining member comprises a tubular section with a substantially closed end. The retaining member is located within a hole formed through the closed end of the socket and is secured fast to the female member. The axis of the retaining member is coincident with coupling axis A. the diameter of the retaining member is less than the internal diameter of the socket, such that the retaining member extends within the socket and from the closed end to a midway position along the socket. The substantially closed end of the retaining member is therefore located within the socket. A hole, coincident with the coupling axis A, is formed through the substantially closed end.

The closing member comprises a central rod section, which includes a radial flange that extends outwardly from one end. The other end is attached to a radial face of a closed end of a tube. The tube is co-incident with the coupling axis A and also the axis of the central rod. The tube extends from the distal end face and towards the opposite end of the central rod. As shown in FIG. 27, the radial flange on the end of the distal rod is housed within the tubular section of the retaining member with the central rod extending through the hole in substantially closed end.

A biasing means such as a spring 1192 operates between the closed end of the socket and an internal face of the closed end of the closing member 1190. The spring biases the closing member towards the open end of the socket. The closing member is stopped in the closed position by abutment between the substantially closed end of the retaining member and the radial flange of the central member of the closing member. The closing member is arranged to stop in the closed position such that the external face of the closed end of the closing member is in the same plain as the open end of the sockets.

In the closed position, the internal sealing ring 1128 seals the socket to the closing member between the open end of the socket and the aperture of the through-bore 1121. An external sealing ring 1193 seals the socket to the closing member on the opposite side of the aperture of the through-bore 1121. As such, in the closed position, fluid in the through-bore 1121 is sealed from escaping the through-bore at the socket end.

An engaging means 1194 is arranged on the outside of the female coupling member and comprises a plate that extends perpendicular and parallel to coupling axis A. The engaging means includes a through hole.

The male and female coupling members may be coupled by initially abutting the two flat ends of each coupling member, as shown in FIG. 28. Coupling may then be initiated by providing a closing force such that the members move to a fully inserted position, as shown in FIG. 29. During the further insertion, the closing member of the male coupling member and the closing member of the female coupling member are urged axially and against the bias of the respective springs 1164 and 1192. Movement is stopped by abutment between the radial flange of the male coupling member and the end of the respective closing member and also by abutment between the closed end of the socket and the end of the respective closing member. As can be seen in FIG. 29, and as previously described, in the fully inserted position the through-bores in each of the coupling members are aligned. Furthermore the external sealing ring of the probe and the internal sealing ring of the socket are arranged about the through-bores as previously described.

Furthermore, in the fully inserted position, the engagement means of the male coupling member and the engagement means of the female coupling member are also aligned. As described in previous embodiments, a breakout pin may be inserted through the respective through-holes in each of the engagement members to thereby provide breakout strength. The pin will also need to be inserted to resist the force of the springs from urging the coupling members apart.

The hole 1119 through the sheath of the male coupling member is arranged to accept a tubular part of the female coupling member through which the internal through-bore 1121 extends. This provides rotational alignment between the two coupling members, which is needed in order to ensure alignment between the through-bores.

Such an embodiment provides several advantages. The embodiment provides flat ends to the couplings, which enables the couplings to be wiped clean easily. The through-bores in each coupling member are also closed when not coupled thereby ensuring fluid running through the bores does not escape during coupling and de-coupling of the assembly.

FIG. 30 shows a twelfth embodiment of the present invention, wherein coupling members 1202, 1203 substantially in accordance with the herein described embodiments are manufactured in a composite structure such as carbon or glass fibre.

It is known that a ±55° wind angle achieves optimum strength for a tube section. Accordingly, bent tubes, such as the male coupling member 1203, would be manufactured with a ±55° wind angle maintained along both the proximal region 1204 with respect to the flow axis B and also along the probe 1206 with respect to the coupling axis A.

FIG. 30 shows the fibre pattern in accordance with the twelfth embodiment of the present invention. The male coupling member comprises a ±55° wind angle along the proximal region but then changes to a 0/90° wind angle along the probe wherein the majority of the fibres are laid along the axial direction. Contrastingly the fibres of the female coupling member are laid with a ±55° wind angle along the open end region 1224 but change to a 0/90° wind angle at the socket section 1222 with the majority of the fibres being laid in the radial direction.

The change in wind angle gives the coupling members greater strength and counteracts the dominant hoop stresses in the area.

The present invention may be used in hydraulic or pneumatic machinery but is preferably used in fluid delivery applications.

A significant advantage of the present invention is that the flow of fluid through the coupling assembly is substantially through a straight conduit. This enables the conduit and the adjoining upstream and downstream fluid passages to be 'pigged', which is a well-known operation within the oil pipeline sector and requires an unobstructed conduit through any couplings.

It will be readily apparent to the appropriately skilled person that a coupling assembly in accordance with the present invention may be conveniently composed of plastics, metals, or any other materials that are know in the art. Further, the precise arrangement of the parts may be varied from those depicted within the accompanying drawings. For instance, it is not required that the coupling assembly be substantially symmetrical, and indeed for some applications it may be advantageous to have eccentrically shaped parts. The cross section of the male member and the corresponding female member socket need not be cylindrical, though this is the preferred embodiment as it allows for rotation of the male member(s) within the female member.

What is claimed is:

1. A coupling assembly for releasably interconnecting fluid passages comprising male and female coupling members, which are mated in use by inserting a probe of the male member into a socket of the female member, the male coupling member being a unitary piece including a proximal region and a distal region in the form of a substantially cylindrical rod that forms the probe, whereby the proximal region includes a first aperture arranged to be connected to a fluid passage, and the male coupling member further includes a through-bore that has a substantially straight axis and that extends continuously in both mated and un-mated configurations between the first aperture and a second aperture on a circumferential face of the probe, wherein the female coupling member includes a first end arranged for connection to a fluid passage and a substantially straight through-bore extending from the first end and a circumferential face of the socket, and wherein when mated in use, the through-bores of each coupling member are coincident along a first longitudinal axis and the probe and socket are coincident along a second longitudinal axis, which is inclined to the first axis and wherein fluid is unable to flow from the through-bore of the male member into the socket when the probe of the male member is fully engaged in the socket, the through-bores along the first longitudinal axis providing a straight fluid conduit between the two fluid passages wherein fluid is substantially retained in the conduit by sealing means.

2. The coupling assembly according to claim 1, wherein the sealing means comprises a first and second annular sealing ring, wherein when mated in use, the first annular sealing ring is arranged on one side of the intersection of the through-bore and socket of the female member and the second annular sealing ring is arranged on the other side of the intersection of the through-bore and socket of the female member.

3. The coupling assembly according to claim 2, wherein the first annular sealing ring comprises an internal annular sealing ring within the socket and the second annular sealing ring comprises an external annular sealing ring on the probe.

4. The coupling assembly according to claim 2, wherein the probe and socket taper adjacent to one or both of the sealing rings so as to prevent damage or removal of the sealing ring by fluid pressure.

5. The coupling assembly according to claim 1, wherein the through-bores in the male and female coupling members are substantially straight, wherein when the coupling members are mated in use the through-bores define a straight fluid conduit.

6. The coupling assembly according to claim 1, wherein the coupling assembly further comprises releasable retaining means arranged to resist the uncoupling of the mated coupling members.

7. The coupling assembly according to claim 1, wherein the retaining means comprises a first part, which, in use, is arranged fast with the male coupling member, and a second part, which, in use, is arranged fast with the female coupling member, and wherein in use the first part and second part engage with each other, said engagement comprising the retaining means.

8. The coupling assembly according to claim 7, wherein the first part comprises a resilient clip that comprises first and second sections arranged about opposing sides of the first longitudinal axis and are joined by a connecting section that in use abuts a flange on the male coupling member, wherein said abutment comprises a first arrangement of the clip and male member, and wherein at least one of said first and second sections includes a plurality of radial teeth spaced from the connecting section.

9. The coupling assembly according to claim 1, wherein the angle of inclination between the probe and the through-bore of the male coupling member, and between the socket and the through-bore of the female coupling member, is the same and is in the range 5-35°.

10. The coupling assembly according to claim 1, wherein the socket of the female coupling member further includes a closed end and an aperture in the socket, wherein, in use, the aperture is arranged in communication with a space between the closed end and a distal end of the probe, such that when the probe is inserted into the socket ambient fluid within the socket is forced out of the aperture and the egress rate of the ambient fluid from the aperture determines the insertion force required to insert the probe into the socket.

11. The coupling assembly according to claim 1, wherein the male and female coupling members further comprise co-operating alignment features wherein said co-operation limits the relative orientation about the second longitudinal axis that the probe can be inserted into the socket.

12. The coupling assembly according to claim 1, wherein one or both of the male and female coupling members comprise a valve, which prevents fluid flow along the through-bore in a closed position and allows fluid flow along the through-bore in an open position.

13. The coupling assembly according to claim 12, wherein the each valve is operable between the open and closed position by rotating an operable feature and wherein the operable feature is operated by a part of the opposing coupling member, such that the valve is rotated from the open position to the closed position when the probe is uncoupled from the socket, the valve further comprising biasing means, which acts to bias the valve towards the closed position, wherein the operable feature is operated by a part of the opposed coupling member such that the valve is moved towards the open position when the probe is inserted into the socket.

14. The coupling assembly according to claim 1, wherein the male coupling member comprises a first and second part, the second part being slidably mounted relative to the first and along the first longitudinal axis, wherein a biasing means biases the second part toward a first position, wherein the female coupling member comprises a recess and when mated in use, the second part engages with the recess to prevent the male and female members from decoupling.

15. The coupling assembly according to claim 14, wherein the recess comprises a first part that is integral with or held fast to the female coupling member and a second part that is separable from the female coupling member, wherein a retaining member secures the second part to the first part.

16. The coupling assembly according to claim 15, wherein the retaining member is resilient such that, when mated in use, and at a given breakout force, the second part moves away from the first part thereby enlarging the recess and allowing, when mated in use, the probe to withdraw from the socket.

17. The coupling assembly according to claim 1, wherein the male and female coupling members each include a respective through-bore closing member.

18. The coupling assembly according to claim 17, wherein one or both of the closing members are moveable between a closed position, in which the closing member extends across a fluid aperture and wherein a first annular sealing ring and a second annular sealing ring are arranged on one side of respective fluid apertures and a further sealing ring is arranged on an opposing side of the respective fluid apertures, and an open position in which the closing members do not extend across the fluid aperture.

19. A method of releasably interconnecting fluid passages comprises inserting a probe of a male coupling member into a corresponding socket of a female coupling member, the coupling members being connected to ends of the fluid passages and at a junction between the fluid passages, the male coupling member being a unitary piece including a proximal region and a distal region in the form of a substantially cylindrical rod that forms the probe, whereby the proximal region includes a first aperture arranged to be connected to one of the fluid passages, and the male coupling member further includes a through-bore that has a substantially straight axis and that extends continuously in both mated and un-mated configurations between the first aperture and a second aperture on a circumferential face of the probe, wherein the female coupling member includes a first end arranged for connection to the other of the fluid passages and a substantially straight through-bore extending from the first end and a circumferential face of the socket, and wherein when mated in use, the through-bores of each coupling member are coincident along a first longitudinal axis and the probe and socket are coincident along a second longitudinal axis, which is inclined to the first axis and wherein fluid is unable to flow from the through-bore of the male coupling member into the socket when the probe of the male coupling member is fully inserted into the socket, the through-bores along the first longitudinal axis providing a straight fluid conduit between the fluid passages wherein fluid is substantially retained in the conduit by sealing means.

* * * * *